United States Patent
Liu et al.

(10) Patent No.: US 12,238,697 B2
(45) Date of Patent: Feb. 25, 2025

(54) TRANSMISSION CONTROL METHOD, CONTROL DEVICE, AND USER EQUIPMENT

(71) Applicant: VIVO MOBILE COMMUNICATION CO., LTD., Dongguan (CN)

(72) Inventors: Siqi Liu, Dongguan (CN); Zichao Ji, Dongguan (CN); Shixiao Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 276 days.

(21) Appl. No.: 17/705,383

(22) Filed: Mar. 27, 2022

(65) Prior Publication Data
US 2022/0217733 A1 Jul. 7, 2022

Related U.S. Application Data

(63) Continuation of application No. PCT/CN2020/117742, filed on Sep. 25, 2020.

(30) Foreign Application Priority Data

Sep. 30, 2019 (CN) .......................... 201910940208.4

(51) Int. Cl.
*H04W 72/12* (2023.01)
*H04W 72/23* (2023.01)

(52) U.S. Cl.
CPC ........... *H04W 72/12* (2013.01); *H04W 72/23* (2023.01)

(58) Field of Classification Search
CPC . H04W 72/12; H04W 72/23; H04W 72/1263; H04W 72/20
See application file for complete search history.

(56) References Cited

U.S. PATENT DOCUMENTS

| | | | |
|---|---|---|---|
| 2019/0150123 A1* | 5/2019 | Nogami | H04W 72/23 370/330 |
| 2021/0050953 A1* | 2/2021 | Park | H04B 7/0456 |
| 2021/0336728 A1* | 10/2021 | Selvanesan | H04L 1/1896 |
| 2022/0167388 A1* | 5/2022 | Hu | H04L 1/22 |
| 2022/0190980 A1* | 6/2022 | Matsumura | H04L 5/0032 |
| 2022/0191913 A1* | 6/2022 | Matsumura | H04L 1/1896 |

FOREIGN PATENT DOCUMENTS

| | | |
|---|---|---|
| CN | 109076521 A | 12/2018 |
| CN | 109474403 A | 3/2019 |

(Continued)

OTHER PUBLICATIONS

3GPP TSG RAN WG1 Meeting #98; R1-1909721; Source: Huawei, HiSilicon; Title: Proposals for Offline Discussion over Multi-TRP/Panel Transmission ; Prague, Czech Republic, Aug. 26-30, 2019. (Year: 2019).*

(Continued)

*Primary Examiner* — Mohammed S Chowdhury
(74) *Attorney, Agent, or Firm* — IPX PLLC

(57) ABSTRACT

Transmission control methods and communications devices are provided. A transmission control method executed by a control device includes: sending first information. The first information is related information of scheduling signaling, and the related information includes a number. An indication manner of the first information comprises indicating for different scheduling signaling associated with different types separately.

14 Claims, 5 Drawing Sheets

(56) References Cited

FOREIGN PATENT DOCUMENTS

| | | |
|---|---|---|
| CN | 109565373 A | 4/2019 |
| CN | 109586877 A | 4/2019 |
| CN | 110149717 A | 8/2019 |
| CN | 110351016 A | 10/2019 |
| CN | 112583532 A | 3/2021 |
| WO | 2018151523 A1 | 8/2018 |

OTHER PUBLICATIONS

3GPP TSG RAN WG1 Meeting #95; R1-1812816; Source: OPPO; Title: UCI enhancement for URLLC; Spokane, USA, Nov. 12-16, 2018 (Year: 2018).*

International Search Report issued in corresponding International Application No. PCT/CN2020/117742, mailed Dec. 24, 2020, 4 pages.

First Office Action issued in related Chinese Application No. 201910940208.4, mailed Jan. 17, 2022, 25 pages.

Catt, "Correction on HARQ-ACK transmission on PUSCH with dynamic codebook", 3GPP TSG-RAN WG1 Meeting #97, R1-1906299, May 2019.

LG Electronics, "Discussion on HARQ-ACK feedback method for NR", 3GPP TSG-RAN WG1 Meeting #88bis, R1-1704917, Mar. 2017.

Second Office Action issued in related Chinese Application No. 201910940208.4, mailed Jul. 8, 2022, 32 pages.

Huawei, HiSilicon, "NR DCI and UCI design for resource allocation mode 1", 3GPP TSG RAN WG1 Meeting # 98, R1-1909315, Aug. 17, 2019.

* cited by examiner

TRANSMISSION CONTROL METHOD, CONTROL DEVICE, AND USER EQUIPMENT

CROSS-REFERENCE TO RELATED APPLICATIONS

This application is a continuation of International Application No. PCT/CN2020/117742, filed Sep. 25, 2020, which claims priority to Chinese Patent Application No. 201910940208.4, filed on Sep. 30, 2019 in China, both of which are incorporated herein by reference in their entireties.

TECHNICAL FIELD

The present disclosure relates to the field of communications technologies, and in particular, to a transmission control method, a control device, and user equipment.

BACKGROUND

In a sidelink (SL) communications system, a control device may be a device that can schedule sidelink transmission of sidelink UE, for example, User Equipment (UE), a Road Side Unit (RSU), or a base station. However, currently, scheduling signaling for scheduling sidelink transmission by the control device is not explicitly specified. If a related number and a counting method are not designed, when UE loses scheduling signaling for scheduling sidelink transmission, the control device cannot maintain the same understanding of a codebook size as the UE, thereby affecting performance of sidelink transmission or even Uu transmission. Therefore, transmission performance of a transmission control manner in the related art is low.

SUMMARY

Embodiments of the present disclosure provide a transmission control method, a control device, and user equipment, resolve a problem of low transmission performance in a transmission control manner in the related art.

To resolve the foregoing technical problem, the embodiments of the present disclosure are implemented as follows:

According to a first aspect, the embodiments of the present disclosure provide a transmission control method, applied to a control device and including:
sending first information, where
the first information is related information of a target object, and the related information includes at least one of the following: a number, a total quantity, and a ratio of the total quantity to a preset value; and
a category of the target object includes at least one of the following:
scheduling signaling, transmission, a feedback, a reference signal, and a sequence.

According to a second aspect, the embodiments of the present disclosure provide a transmission control method, applied to user equipment and including:
obtaining related information of a target object, where
the related information includes at least one of the following:
a number, a total quantity, and a ratio of the total quantity to a preset value; and
a category of the target object includes at least one of the following:
scheduling signaling, transmission, a feedback, a reference signal, and a sequence.

According to a third aspect, the embodiments of the present disclosure provide a control device, including:
a first sending module, configured to send first information, where
the first information is related information of a target object, and the related information includes at least one of the following: a number, a total quantity, and a ratio of the total quantity to a preset value; and
a category of the target object includes at least one of the following:
scheduling signaling, transmission, a feedback, a reference signal, and a sequence.

According to a fourth aspect, the embodiments of the present disclosure provide user equipment, including:
an obtaining module, configured to obtain related information of a target object, where
the related information includes at least one of the following:
a number, a total quantity, and a ratio of the total quantity to a preset value; and
a category of the target object includes at least one of the following:
scheduling signaling, transmission, a feedback, a reference signal, and a sequence.

According to a fifth aspect, the embodiments of the present disclosure provide a communications device, including a memory, a processor, and a computer program that is stored in the memory and that can be run on the processor, where when the computer program is executed by the processor, the steps of the foregoing transmission control method can be implemented.

According to a sixth aspect, the embodiments of the present disclosure provide a computer-readable storage medium, where the computer-readable storage medium stores a computer program, and when the computer program is executed by a processor, the steps of the foregoing transmission control method can be implemented.

In the embodiments of the present disclosure, related information of a target object (for example, scheduling signaling) is sent, so that user equipment and a control device can maintain a unified understanding of a quantity and/or a number of the target object, thereby maintaining a unified understanding of feedback information and a corresponding codebook, helping the user equipment determine content and/or a size of the feedback information and the corresponding codebook, and improving transmission performance. Further, retransmission caused by user equipment for some reasons (for example, missing detection of scheduling signaling) may be further reduced, and complexity of detecting feedback information by the control device is reduced.

Further, in the embodiments of the present disclosure, in a case that a base station schedules both Uu transmission and sidelink transmission of the user equipment, impact on Uu transmission and feedback caused by a Downlink Control Information (DCI) loss of scheduling Uu transmission may be reduced, or impact on sidelink transmission and feedback caused by a DCI loss of scheduling Uu transmission may be reduced, thereby improving transmission performance.

BRIEF DESCRIPTION OF DRAWINGS

To describe the technical solutions in the embodiments of the present disclosure more clearly, the following briefly describes the accompanying drawings required in the embodiments of the present disclosures. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
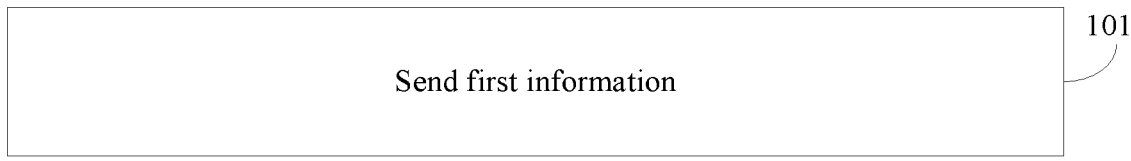
FIG. 1 is a flowchart of a transmission control method according to an embodiment of the present disclosure.

To describe the technical solutions in the embodiments of the present disclosure more clearly, the following briefly describes the accompanying drawings required in the embodiments of the present disclosures. The accompanying drawings in the following description show merely some embodiments of the present disclosure, and a person of ordinary skill in the art may still derive other drawings from these accompanying drawings without creative efforts.

For ease of understanding, the following first describes some content in the embodiments of the present disclosure.

In the embodiments of the present disclosure, a control device may be UE, for example, sidelink UE, an RSU, or a base station. For example, in New Radio (NR) Uu, the control device is a base station or some Integrated Access Backhauls (IABs). In a sidelink, the control device may be UE, an RSU, or a base station, or may be some other network facilities similar to the RSU or the IAB. Therefore, in the embodiments, some control devices may have both a sidelink and a Uu link.

There are a plurality of resource allocation modes in sidelink. One is that the control device schedules sidelink transmission of user equipment by using scheduling signaling (for example, DCI or Sidelink Control Information (SCI)). In this case, the control device allocates a resource used for sidelink transmission. The control device allocates, by using one piece of scheduling signaling, the resource used for sidelink transmission, where the resource allocation includes resource allocation of a Physical Sidelink Shared Channel (PSSCH) (a data channel on sidelink) and a Physical Sidelink Control Channel (PSCCH) (a control channel on sidelink). After receiving configuration information, the user equipment sends SCI and data on a configured resource. The SCI carries related information of data scheduled by using the SCI, such as resource allocation and modulation and coding. A relationship between SCI and sidelink data is similar to a relationship between scheduling signaling and downlink data.

In some embodiments, when the control device is a Long Term Evolution (LTE) base station, NR sidelink (Inter-Radio Access Technology (RAT) sidelink scheduling) or LTE sidelink (intra-RAT sidelink scheduling) may be scheduled. When the control device schedules NR sidelink, a target resource for transmitting a codebook may be an LTE Physical Uplink Control Channel (PUCCH) or a Physical Uplink Shared Channel (PUSCH) resource. When the control device is a base station of 5G or a later version, NR sidelink (intra-RAT sidelink scheduling) or LTE sidelink (Inter-RAT sidelink scheduling) may be scheduled.

In NR, for transmission of a downlink data packet, the user equipment may feed back Hybrid Automatic Repeat reQuest-ACKnowledgment (HARQ-ACK) information (that is, a Negative-ACKnowledgment (NACK) or an ACK) on an uplink resource (for example, a PUCCH or a PUSCH) based on a receiving status of the user equipment, to notify the control device whether transmission of the downlink data packet succeeds, thereby helping the control device determine whether retransmission or new transmission is required. This mechanism can effectively improve reliability and resource utilization of downlink data transmission.

To improve reliability and resource utilization of data transmission on sidelink, a HARQ feedback mechanism is also introduced in a sidelink technology: After receiving sidelink data, sidelink receive user equipment feeds back sidelink HARQ-ACK information, to indicate whether sidelink transmission succeeds or fails. After receiving the sidelink HARQ-ACK information on sidelink, sidelink transmit user equipment can learn whether the previous transmission succeeds or fails. It should be noted that sidelink user equipment may be transmit user equipment or receive user equipment, that is, same user equipment may separately perform receiving or sending in different time or frequency domain.

Transmission of a sidelink data packet may be performed between a base station and user equipment, or may be performed on sidelink between user equipment. Therefore, the base station may not directly learn whether transmission of the sidelink data packet succeeds. The user equipment needs to send sidelink HARQ-ACK information (for example, a sidelink ACK/NACK) to the base station, so that the base station can further determine whether sidelink transmission succeeds. It should be noted that, user equipment that sends sidelink HARQ-ACK information corresponding to sidelink transmission to the base station may be receive user equipment that receives sidelink transmission, or may be transmit user equipment that sends sidelink transmission.

If the base station sends a plurality of transport blocks (TBs), and the base station instructs the user equipment to feed back HARQ-ACK information corresponding to the TBs to the base station on a same resource, the user equipment may multiplex the HARQ-ACK bit information of the TBs into a new piece of HARQ-ACK information (for example, one bitmap) based on a codebook specified in a protocol, and report the new HARQ-ACK information to the base station. A determining manner of a HARQ-ACK codebook includes two manners: a semi-static determining manner and a dynamic determining manner. When the semi-static determining manner is used, the HARQ-ACK codebook is a semi-static codebook with a fixed size. When the dynamic determining manner is used, the HARQ-ACK codebook is a dynamic codebook, and a size of the codebook may be dynamically changed.

To ensure that the base station and the user equipment have a same understanding of a quantity of pieces of sent DCI and a size of corresponding HARQ-ACK information, currently, a Downlink Assignment Index (DAI) field is introduced in DCI, where a counter DAI (cDAI) is used to indicate a number of current DCI, and a total DAI (tDAI) is used to indicate a total quantity of pieces of DCI sent at a current time point (monitoring location).

In the embodiments of the present disclosure, the user equipment may obtain and/or determine sidelink information, and send the sidelink information to the control device. The sidelink information may be at least one of sidelink HARQ-ACK information, a sidelink Scheduling Request (SR), sidelink Channel State Information (CSI), and the like corresponding to sidelink transmission between the user equipment and other user equipment.

In some embodiments, the sending the sidelink information to the control device may include two cases:

Case 1: TX UE (transmit user equipment) sends sidelink transmission; RX UE (receive user equipment) receives sidelink transmission and determines corresponding sidelink HARQ-ACK information; the RX UE feeds back the sidelink HARQ-ACK information to the TX UE by using a Physical Sidelink Feedback Channel (PSFCH) or a PSSCH; and the TX UE receives sidelink HARQ-ACK information corresponding to at least one sidelink transmission or receives sidelink HARQ-ACK information from at least one RX UE, where the information is sidelink information. In this case, the TX UE sends the sidelink information to the control device.

Case 2: RX UE receives at least one sidelink transmission and determines corresponding sidelink HARQ-ACK information, where the information is sidelink information. In this case, the RX UE sends the sidelink information to Uu control device (for example, a base station).

Further, when target resources (uplink resources such as PUCCHs or PUSCHs) for sending the sidelink information and uplink control information corresponding to the Uu transmission (for example, at least one of HARQ-ACK information, CSI, and an SR corresponding to Uu transmission) by the TX UE or the RX UE overlap, the TX UE or the RX UE may multiplex the sidelink information and the uplink control information corresponding to Uu transmission, and send the multiplexed information to the base station by using the target resource (the uplink resource). Alternatively, when target resources (sidelink resources, for example, PSFCHs or PSSCHs) for sending the sidelink information and second sidelink information corresponding to transmission between the TX UE or the RX UE and a sidelink control device (that is, sidelink information corresponding to sidelink transmission between the UE and the control device) by the TX UE or the RX UE overlap, the TX UE or the RX UE may multiplex the sidelink information and the second sidelink information, and send the multiplexed information to the sidelink control device (for example, a vehicle head) by using the target resource (sidelink resource). It can be understood that the second sidelink information is essentially also sidelink information. However, the description "second" is used herein for a purpose of distinguishing.

It should be noted that the foregoing sidelink information, the second sidelink information, the uplink control information corresponding to Uu transmission, and the multiplexed information thereof are all feedback information. The foregoing sidelink transmission may be receiving or sending.

In some embodiments, sidelink transmission may be abbreviated as SL transmission.

In some embodiments, a sidelink, a secondary link, a side link, an edge link, a direct communication link, a sidelink, and an SL in this specification may be interchanged.

The following describes the present disclosure in detail with reference to embodiments and accompanying drawings.

Referring to FIG. 1, FIG. 1 is a flowchart of a transmission control method according to an embodiment of the present disclosure. The method is applied to a control device. As shown in FIG. 1, the method includes the following steps.

Step 101: Send first information.

The first information is related information of a target object. The related information of the target object may include at least one of the following:

a number of the target object, for example, the number is similar to the foregoing cDAI;

a total quantity of the target object, for example, the total quantity is similar to the foregoing tDAI; and a ratio of the total quantity of the target object to a preset value; for example, the preset value may be K, and may be preset based on an actual situation.

It can be understood that the first information may be indicated by the control device to user equipment. For example, a base station sends the first information to UE1, or UE2 sends the first information to the UE1. For example, one or more target objects may be involved in the foregoing first information. One target object has only one category, and a plurality of target objects may correspond to one category, or different target objects may correspond to different categories.

In some embodiments, a category of the target object involved in the foregoing first information may include at least one of the following:

1. Scheduling Signaling

For example, the scheduling signaling is scheduling signaling for scheduling sidelink transmission by the control device, and may be DCI and/or an SCI.

For another example, the scheduling signaling is DCI for scheduling a Physical Downlink Shared Channel (PDSCH) or a PUSCH by the control device.

In an implementation, when the target object is scheduling signaling, related information of the scheduling signaling indicated by the control device includes at least one of the following:

a number of the scheduling signaling (similar to the cDAI);

a total quantity of the scheduling signaling (similar to the tDAI); and a ratio of the total quantity of the scheduling signaling to K (for example, K=4, total DAI/4=j).

2. Transmission

Optionally, the transmission may be receiving or sending.

For example, the transmission is Uu transmission and/or sidelink transmission. The Uu transmission may be at least one of PDSCH transmission and PUSCH transmission. The sidelink transmission may be at least one of PSCCH scheduling and PSSCH scheduling. For another example, sidelink transmission may be at least one of inter-RAT sidelink transmission and intra-RAT sidelink transmission.

It should be noted that the transmission mentioned in this specification may be actual transmission (for example, a resource actually used for transmission) or possible transmission (for example, a candidate resource that may be used for transmission).

3. Feedback

In an implementation, the feedback represents feedback information, for example, sidelink transmission corresponds to the foregoing sidelink information and/or Uu transmission corresponds to uplink control information.

In another implementation, the feedback represents a resource for feedback information, for example, at least one of a PSFCH resource for transmitting sidelink information, a PSSCH resource for transmitting sidelink information, a PUCCH resource for transmitting uplink control information corresponding to Uu transmission, and a PUSCH resource for transmitting uplink control information corresponding to Uu transmission.

4. Reference Signal

For example, the reference signal may be at least one of a Demodulation Reference Signal (DMRS), a random access signal (PRACH, Physical Random Access Channel), a Channel State Information Reference Signal (CSI-RS), a Sounding Reference Signal (SRS), and a Phase-tracking reference signal (PT-RS) on Uu.

For example, the reference signal may be at least one of a DMRS, a PRACH, a CSI-RS, an SRS, and a PT-RS on sidelink.

5. Sequence

For example, the sequence is a synchronization sequence of sidelink.

For example, the sequence is a synchronization sequence of Uu.

In this embodiment of the present disclosure, related information of a target object (for example, scheduling signaling) is sent, so that user equipment and a control device can maintain a unified understanding of a quantity and/or a number of the target object, thereby maintaining a unified understanding of feedback information and a corresponding codebook, helping the user equipment determine content and/or a size of the feedback information and the corresponding codebook, and improving transmission performance. Further, retransmission caused by user equipment for some reasons (for example, missing detection of scheduling signaling) may be further reduced, and complexity of detecting feedback information by the control device is reduced.

In addition, in a case that a base station schedules both Uu transmission and sidelink transmission of the user equipment, impact on Uu transmission and feedback caused by a DCI loss of scheduling Uu transmission may be reduced, or impact on sidelink transmission and feedback caused by a DCI loss of scheduling Uu transmission may be reduced, thereby improving transmission performance.

In this embodiment of the present disclosure, when the first information corresponds to at least one target object, each target object may be associated with one or more identifiers; and/or each target object is associated with one or more types.

In this embodiment of the present disclosure, an indication manner of content in the first information may be a separate indication manner and/or a joint indication manner, or the content may be indicated based on at least one of a category, an identifier, and a type. Specifically, an indication manner of the first information may include at least one of the following:

1. Separately Indicate Target Objects with Different Categories Based on Categories For example, for scheduling signaling and transmission (the two have different categories), the control devices separately indicate related information of scheduling signaling and/or related information of transmission.

2. Separately Indicate Target Objects Associated with Different Identifiers Based on Identifiers In some embodiments, the identifier may include at least one of the following: a Radio Network Temporary Identity (RNTI) of a target object (for example, scheduling signaling or transmission), an identifier of a search space corresponding to a target object (for example, scheduling signaling), an identifier of a monitoring location corresponding to a target object (for example, scheduling signaling), a carrier identifier, a resource pool identifier, a user identifier, a source identifier, a destination identifier, a group identifier, a service identifier, a transmission identifier, a Quality of Service (QoS) identifier, a scrambling code identifier, a sequence identifier, a reference signal identifier, an index identifier, and the like.

The monitoring location may be an occasion (occasion), a frequency domain location (for example, a carrier), or a time-frequency domain location. In this embodiment, for example, the monitoring location is a monitoring time in a specific time range, that is, a timing. However, another method is not excluded.

In an implementation, for example, the target object is scheduling signaling, and a corresponding indication manner may be at least one of the following:

(1) Related information of scheduling signaling using sidelink RNTIs and/or related information of scheduling signaling using Uu RNTIs (for example, at least one of a Cell-RNTI (C-RNTI), a Configured Scheduling-RNTI (CS-RNTI), and the like in Uu transmission) is separately indicated based on different RNTIs.

For example, a category of the target object is DCI. It is assumed that DCI scrambled by using an SL-RNTI is referred to as SL DCI, where the SL-RNTI is a RNTI corresponding to at least one of the following: activation of a sidelink resource (authorization), deactivation of a sidelink resource (authorization), and sidelink transmission. DCI scrambled by using a Uu RNTI is abbreviated as Uu DCI.

In an implementation, related information of the DCI is indicated based on an identifier of the DCI (for example, the DCI is scrambled by using an SL-RNTI or a Uu RNTI). That is, the SL DCI indicates only a number and/or a total quantity of the DCI scrambled by using the SL-RNTI, and the Uu DCI indicates only a number and/or a total quantity of the DCI scrambled by using the Uu RNTI. For example, the base station separately sends, at moments t−5, t−4, t−3, t−2, and t−1, the DCI scrambled by using the SL-RNTI, the DCI scrambled by using the SL-RNTI, the Uu DCI scrambled by using the Uu RNTI, the Uu DCI scrambled by using the Uu RNTI, and the SL DCI scrambled by using the SL-RNTI. In this case, the SL DCI at the moment t−5 indicates that a number of the SL DCI is 0, and a total quantity of the SL DCI is 1. The SL DCI at the moment t−4 indicates that a number of the SL DCI is 1, and a total quantity of the SL DCI is 2. The SL DCI at the moment t−1 indicates that a number of the SL DCI is 2, and a total quantity of the SL DCI is 3.

In the foregoing example, the SL-RNTI may include only one RNTI, for example, a corresponding RNTI when the base station dynamically schedules sidelink transmission; or may include a plurality of RNTIs, for example, a corresponding SL-RNTI-1 during inter-RAT dynamic scheduling of sidelink transmission and a corresponding SL-RNTI-2 during intra-RAT dynamic scheduling of sidelink transmission, or a corresponding SL-RNTI-3 during dynamic scheduling of sidelink transmission, and an SL-RNTI-4 during activation and deactivation of a sidelink resource (authorization).

It should be noted that the foregoing Uu RNTI may include at least one of an Random Access-RNetworkTI (RA-RNTI), a temporary C-RNTI, a C-RNTI, an Modulation and Coding Scheme-C-RNTI (MCS-C-RNTI), a CS-RNTI, a Transmit Power Control-PUCCH-RNTI (TPC-PUCCH-RNTI), a TPC-PUSCH-RNTI, a TPC-SRS-RNTI, INTerruption-RNTI (INT-RNTI), Slot Format Indicator-RNTI (SFI-RNTI), a Paging-RNTI (P-RNTI), System Information-RNTI (SI-RNTI), and an SemiPersistent-CSI-RNTI (SP-CSI-RNTI), which are not distinguished in this embodiment of the present disclosure.

For another example, a category of the target object is DCI. It is assumed that in a case of intra-RAT scheduling of sidelink transmission, for example, in a case that an NR base station schedules NR sidelink transmission by using DCI, the DCI is scrambled by using an SL RNTI-X, and the DCI is referred to as intra-RAT SL DCI. The SL RNTI-X is an RNTI associated with at least one of the following: activation of a sidelink resource (authorization), deactivation of a sidelink resource (authorization), and sidelink transmission.

In a case of inter-RAT scheduling of sidelink transmission, for example, in a case that an NR base station schedules LTE sidelink transmission by using DCI, the DCI is scrambled by using an SL RNTI-Y, and the DCI is referred to as inter-RAT SL DCI. The SL RNTI-Y is an RNTI associated with at least one of the following: activation of a sidelink resource (authorization), deactivation of a sidelink resource (authorization), and sidelink transmission.

In an implementation, related information of the DCI is indicated based on an identifier of the DCI (for example, the DCI is scrambled by using an SL RNTI-X or SL RNTI-Y). That is, the intra-RAT SL DCI indicates only a number and/or a total quantity of the DCI scrambled by using the SL-RNTI-X, and the inter-RAT SL DCI indicates only a number and/or a total quantity of the DCI scrambled by using the SL RNTI-Y. For example, a base station separately sends the intra-RAT SL DCI, the intra-RAT SL DCI, the inter-RAT SL DCI, the inter-RAT SL DCI, and the intra-RAT SL DCI at moments t−5, t−4, t−3, t−2, and t−1. In this case, the intra-RAT SL DCI at the moment t−5 indicates that a number of the intra-RAT SL DCI is 0, and a total quantity of the intra-RAT SL DCI is 1. The inter-RAT SL DCI at the moment t−2 indicates that a number of the inter-RAT SL DCI is 1, and a total quantity of the inter-RAT SL DCI is 2. The intra-RAT SL DCI at the moment t−1 indicates that a number of the intra-RAT SL DCI is 2, and a total quantity of the SL DCI is 3.

It can be understood that, the foregoing SL-RNTI and the foregoing SL-RNTI-x are only named for convenience of illustration, and in an actual technology, other names may be used instead.

(2) Related information of scheduling signaling in different search spaces is separately indicated based on different search space identifiers.
(3) Related information of scheduling signaling in different monitoring locations is separately indicated based on different monitoring location identifiers.
(4) Related information of scheduling signaling on different carriers is separately indicated based on different carrier identifiers.
(5) Related information of scheduling signaling in different resource pools is separately indicated based on different resource pool (resource pool) identifiers.

For example, a category of the target object type is DCI. It is assumed that DCI for scheduling sidelink transmission is referred to as SL DCI for short. In an implementation, related information of DCI is indicated based on an identifier of a resource pool in which sidelink transmission scheduled by using the DCI is located. That is, when SL DCI transmitted on a sidelink resource pool is scheduled, only a number and/or a total quantity of the SL DCI transmitted on the sidelink resource pool is scheduled. For example, a base station separately sends the SL DCI at moments t−5, t−4, t−3, t−2, and t−1. The five pieces of SL DCI are used to respectively schedule sidelink transmission on a resource pool 1, a resource pool 1, a resource pool 2, a resource pool 2, and a resource pool 1. In this case, the SL DCI at the moment t−5 indicates that a number of the SL DCI is 0, and a total quantity of the SL DCI is 1. The SL DCI at the moment t−4 indicates that a number of the SL DCI is 1, and a total quantity of the SL DCI is 2. The SL DCI at the moment t−1 indicates that a number of the SL DCI is 2, and a total quantity of the SL DCI is 3.

(6) Related information of scheduling signaling corresponding to different receiving devices and/or sending devices is separately indicated based on different user identifiers.
(7) Related information of scheduling signaling corresponding to different user groups is separately indicated based on different group identifiers.
(8) Related information of scheduling signaling corresponding to different services is separately indicated based on different service identifiers.
(9) Related information of scheduling signaling corresponding to different transmission is separately indicated based on different transmission identifiers.
(10) Related information of scheduling signaling corresponding to different Qos requirements is separately indicated based on different Qos identifiers.
(11) Related information of scheduling signaling corresponding to different source identifiers is separately indicated based on different source identifiers (source id).
(12) Related information of scheduling signaling corresponding to different destination identifiers is separately indicated based on different destination identifiers.

For example, a category of the target object type is DCI. It is assumed that DCI for scheduling sidelink transmission is referred to as SL DCI for short. In an implementation, the related information of the DCI is indicated based on a destination identifier (destination ID) carried in sidelink transmission scheduled by using the DCI. That is, SL DCI carrying a destination identifier indicates only a number and/or a total quantity of the SL DCI carrying the destination identifier.

For example, a base station separately sends the SL DCI at moments t−5, t−4, t−3, t−2, and t−1, where destination identifiers in the five pieces of SL DCI are 1, 1, 2, 2, and 1 respectively. In this case, the SL DCI at the moment t−5 indicates that a number of the SL DCI is 0, and a total quantity of the SL DCI is 1. The SL DCI at the moment t−4 indicates that a number of the SL DCI is 1, and a total quantity of the SL DCI is 2. The SL DCI at the moment t−1 indicates that a number of the SL DCI is 2, and a total quantity of the SL DCI is 3.

3. Separately Indicate Target Objects Associated with Different Types Based on Types In some embodiments, the type may include at least one of the following: a type of transmission of a target object (for example, a type of transmission scheduled by using scheduling signaling), a type of a search space in which a target object (for example, scheduling signaling) is located, a type of a monitoring location in which a target object (for example, scheduling signaling) is located, a carrier type, a resource pool type, a user type, a group type, a service type, a transmission manner type (for example, a transmission manner is one of unicast, broadcast, and multicast, or a transmission manner is one of transmission of one TB at a time, transmission of a plurality of TBs at a time, and transmission of a plurality of Code Block Groups (CBGs) at a time), a resource type (for example, an NR Uu resource, an LTE Uu resource, an NR sidelink resource, or an LTE sidelink resource, or more specifically, a PDSCH or a PSSCH, or a Physical Downlink Control Channel (PDCCH) or a PSCCH), and the like.

For example, a category of the target object is transmission. It is assumed that DCI for scheduling sidelink transmission is referred to as SL DCI for short, and DCI for scheduling Uu transmission is referred to as Uu DCI for short. In an implementation, related information of sidelink transmission is indicated based on a type of (corresponding) transmission scheduled by using DCI (for example, the scheduled transmission is SL transmission or Uu transmission). That is, the SL DCI indicates only a number and/or a total quantity of scheduled SL transmission. For example, a base station sends SL DCI, SL DCI, Uu DCI, Uu DCI, and SL DCI to same UE at moments t−5, t−4, t−3, t−2, and t−1, and each SL DCI is used to schedule one sidelink TB. In this case, the SL DCI at the moment t−5 indicates that a number of SL transmission scheduled by using the DCI is 0, and a total quantity of SL transmission is 1. The SL DCI at the moment t−4 indicates that a number of SL transmission scheduled by using the DCI is 1, and a total quantity of SL transmission is 2. The SL DCI at the moment t−1 indicates that a number of SL transmission scheduled by using the DCI is 2, and a total quantity of SL transmission is 3.

For another example, a category of the target object is DCI. It is assumed that DCI for scheduling sidelink transmission is referred to as SL DCI for short, and DCI for scheduling Uu transmission is referred to as Uu DCI for short. In an implementation, related information of DCI is indicated based on a type of (corresponding) transmission scheduled by using the DCI (for example, the scheduled transmission is SL transmission or Uu transmission). That is, the SL DCI indicates only a number and/or a total quantity of the SL DCI, and the Uu DCI indicates only a number and/or a total quantity of the Uu DCI. For example, a base station sends SL DCI, SL DCI, Uu DCI, Uu DCI, and SL DCI to same UE at moments t−5, t−4, t−3, t−2, and t−1. In this case, the SL DCI at the moment t−5 indicates that a number of the SL DCI is 0, and a total quantity of the SL DCI is 1. The SL DCI at the moment t−4 indicates that a number of the SL DCI is 1, and a total quantity of the SL DCI is 2. The SL DCI at the moment t−1 indicates that a number of the SL DCI is 2, and a total quantity of the SL DCI is 3.

For example, a category of the target object is DCI. It is assumed that in a case of intra-RAT scheduling of sidelink, for example, in a case that an NR base station schedules NR sidelink by using DCI, the DCI is referred to as intra-RAT SL DCI. In a case of inter-RAT scheduling of sidelink, for example, in a case that an NR base station schedules LTE sidelink by using DCI, the DCI is referred to as inter-RAT SL DCI.

In an implementation, related information of DCI is indicated based on a sidelink resource type of the DCI (the DCI is used to schedule an NR sidelink resource or an LTE sidelink resource). That is, the intra-RAT SL DCI indicates only a number and/or a total quantity of the intra-RAT SL DCI, and the inter-RAT SL DCI indicates only a number and/or a total quantity of the inter-RAT SL DCI. For example, a base station separately sends the intra-RAT SL DCI, the intra-RAT SL DCI, the inter-RAT SL DCI, the inter-RAT SL DCI, and the intra-RAT SL DCI at moments t−5, t−4, t−3, t−2, and t−1. In this case, the intra-RAT SL DCI at the moment t−5 indicates that a number of the intra-RAT SL DCI is 0, and a total quantity of the intra-RAT SL DCI is 1. The inter-RAT SL DCI at the moment t−2 indicates that a number of the inter-RAT SL DCI is 1, and a total quantity of the inter-RAT SL DCI is 2. The intra-RAT SL DCI at the moment t−1 indicates that a number of the intra-RAT SL DCI is 2, and a total quantity of the SL DCI is 3. It should be noted that in this embodiment, it is assumed that numbering is performed from 0.

For example, a category of a target object is transmission. In an implementation, related information of transmission is indicated based on a resource type of transmission. It is assumed that transmission locations are separately configured at moments t−5, t−4, t−3, t−2, and t−1. The five locations include an SL (transmission) resource, an SL (transmission) resource, a Uu (transmission) resource, a Uu (transmission) resource and an SL (transmission) resource respectively. In this case, DCI corresponding to the SL (transmission) resource at the moment t−5 indicates that a number of SL transmission is 0, and a total quantity of SL transmission is 1. DCI corresponding to the SL (transmission) resource at the moment t−4 indicates that a number of SL transmission is 1, and a total quantity of SL transmission is 2. It should be noted that in this embodiment, it is assumed that numbering is performed from 0.

In an implementation, for example, the target object is scheduling signaling, and a corresponding indication manner may be at least one of the following:

(1) Related information of scheduling signaling for scheduling sidelink transmission and/or related information of scheduling signaling for scheduling Uu transmission are separately indicated based on types of transmission of scheduling signaling.

Alternatively, related information of scheduling signaling for scheduling inter-RAT sidelink transmission and/or related information of scheduling signaling for scheduling intra-RAT sidelink transmission are separately indicated based on types of transmission of scheduling signaling.

(2) Related information of scheduling signaling in a sidelink dedicated search space and/or related information of scheduling signaling in another search space are separately indicated based on types of search spaces.

(3) Related information of scheduling signaling in a monitoring location that is used to schedule sidelink transmission and/or related information of scheduling signaling in a monitoring location that is used to schedule Uu transmission are separately indicated based on types of monitoring locations.

4. Target objects with different categories are jointly indicated.

5. Target objects with a plurality of types are jointly indicated.
6. Target objects with a plurality of identifiers are jointly indicated.

For example, the target object is scheduling signaling. A number and/or a total quantity of scheduling signaling for scheduling sidelink transmission and for scheduling Uu transmission may be jointly indicated.

In this embodiment of the present disclosure, the foregoing first information may be sent by using first signaling, that is, the control device may send the related information of the target object by using the first signaling. The first signaling may include at least one of the following: scheduling signaling, higher layer signaling, a System Information Block (SIB), and the like.

For example, the first signaling may be scheduling signaling such as DCI and/or SCI for scheduling sidelink transmission by the control device.

For another example, the first signaling may be DCI for a PDSCH or a PUSCH by the control device, or SCI for scheduling a PSSCH by the control device.

Further, in a case that the first signaling is scheduling signaling for scheduling a PUSCH, the first information may be related information associated with Uu transmission. For example, when the first signaling is the scheduling signaling for scheduling the PUSCH, only the related information associated with Uu transmission may be indicated. The associated Uu transmission may be understood as a target object.

For example, scheduling signaling for scheduling a PDSCH may indicate related information associated with Uu transmission and sidelink transmission (for example, joint related information). However, the scheduling signaling for scheduling the PUSCH indicates only the related information associated with Uu transmission.

Further, in a case that the first signaling is scheduling signaling for scheduling a PSSCH, the first information may be related information associated with SL transmission. For example, when the first signaling is the scheduling signaling for scheduling the PSSCH, only the related information associated with SL transmission may be indicated. The associated SL transmission may be understood as a target object.

Further, the first signaling may include indication information, and the indication information is used to indicate whether the first signaling includes first information, so that the user equipment obtains the first information.

For example, the DCI carries 1-bit indication information. When the bit is 1, it indicates that the DCI carries the first information; otherwise, it indicates that the DCI does not carry the first information. Alternatively, when the bit is 0, it indicates that the DCI carries the first information; otherwise, it indicates that the DCI does not carry the first information.

In some embodiments, an indication manner of the first information may include at least one of the following:

(1) Different indication manners are used for different related information of target objects.

The target objects are associated with different feature information, the feature information includes at least one of a type and an identifier, and the different indication manners include a joint indication manner and a separate indication manner.

For example, a separate indication manner is used for numbers in the related information, and a joint indication manner is used for a total quantity in the related information:

For example, scheduling signaling associated with different types (for example, sidelink and Uu) separately indicates numbers of different types of scheduling signaling. For example, the scheduling signaling for scheduling sidelink transmission indicates a number of the scheduling signaling for scheduling sidelink transmission, which is denoted as a sidelink-cDAI. The scheduling signaling for scheduling Uu transmission indicates a number of the scheduling signaling for scheduling Uu transmission, which is denoted as a Uu-cDAI. However, for different types of scheduling signaling, a same total quantity is indicated. For example, at least one of the scheduling signaling for scheduling sidelink transmission and the scheduling signaling for scheduling Uu transmission indicates a total quantity of the scheduling signaling for scheduling sidelink transmission and the scheduling signaling for scheduling Uu transmission, which is denoted as a multi-tDAI.

For another example, scheduling signaling with different identifiers (for example, a sidelink RNTI and a Uu RNTI) separately indicates numbers of the scheduling signaling with different identifiers. For example, scheduling signaling scrambled by using a sidelink RNTI is used to indicate a number of the scheduling signaling scrambled by using the sidelink RNTI, which is denoted as a sidelink-cDAI. Scheduling signaling scrambled by using a Uu RNTI indicates a number of the scheduling signaling scrambled by using the Uu RNTI, which is denoted as a Uu-cDAI. However, scheduling signaling with different identifiers indicates a same total quantity. For example, at least one of the scheduling signaling scrambled by using the sidelink RNTI and the scheduling signaling scrambled by using the Uu RNTI indicates a total quantity of the scheduling signaling scrambled by using the sidelink RNTI and the scheduling signaling scrambled by using the Uu RNTI, which is denoted as a multi-tDAI.

(2) A target object in a valid monitoring location is indicated.

In (2), specifically, only the target object in the valid monitoring location may be indicated. For example, only related information of scheduling signaling in a monitoring location that does not overlap another resource is indicated, but related information of scheduling signaling in a monitoring location that overlaps another resource is not processed, for example, is not counted.

In some embodiments, in a case that the control device sends N pieces of first information (N is an integer greater than 1), the N pieces of first information may have at least one of the following cases:

(1) Categories of target objects corresponding to the N pieces of first information may be the same or may be different.

For example, the control device may indicate related information of N pieces of scheduling signaling. Alternatively, the control device may indicate that related information of A target objects: scheduling signaling, and related information of N-A target objects: feedbacks.

(2) Target objects corresponding to M1 (a positive integer less than or equal to N) pieces of first information in the N pieces of first information are associated with different feature information.

The feature information includes at least one of a type and an identifier.

In (2), if the M1 pieces of first information correspond to one target object, the target object may be associated with different feature information, that is, different identifiers and/or types. Alternatively, if different first information in the M1 pieces of first information corresponds to respective target objects, the respective target objects may be separately associated with different feature information, that is, different identifiers and/or types.

For example, the target object is scheduling signaling. The control device sends first signaling sidelink DCI and Uu DCI, where the sidelink DCI includes related information such as a sidelink-cDAI and/or a sidelink-tDAI for the target object sidelink DCI, and the Uu DCI includes related information such as a Uu-cDAI and/or a Uu-tDAI for the target object Uu DCI. That is, the target objects (scheduling signaling) corresponding to the related information sent by the control device are associated with different types, that is, sidelink and Uu, or associated with different identifiers, that is, sidelink and Uu.

For another example, the control device sends first signaling inter-RAT sidelink DCI and intra-RAT sidelink DCI, where the inter-RAT sidelink DCI includes related information for the target object inter-RAT sidelink DCI, and the intra-RAT sidelink DCI includes related information for the target object intra-RAT sidelink DCI. That is, the target objects (scheduling signaling) corresponding to the related information sent by the control device are associated with different resource types, that is, inter-RAT sidelink and intra-RAT sidelink, or associated with different identifiers, that is, an inter-RAT sidelink identifier and an intra-RAT sidelink identifier.

Further, in a case that the target objects corresponding to the M1 pieces of first information are associated with different feature information, first signaling associated with first feature information includes at least related information of a target object associated with the first feature information. The first feature information includes at least one of a first type and a first identifier. It can be understood as the related information is indicated in a separate indication manner.

For example, the first signaling associated with the first type includes at least related information of a target object associated with the first type.

For another example, the first signaling associated with the first identifier includes at least related information of a target object associated with the first identifier.

For another example, the first signaling associated with the first type and the first identifier includes at least related information of a target object associated with the first type and the first identifier.

Further, the first signaling associated with the first feature information may further include related information of a target object associated with second feature information. The second feature information includes at least one of at least one second type and at least one second identifier. It can be understood as the related information is indicated in a joint indication manner.

For example, the first signaling sidelink DCI includes related information such as a sidelink-cDAI and/or a sidelink-tDAI for the target object sidelink DCI, but may further include related information such as a multi-cDAI and/or a multi-tDAI for the target object Uu DCI and sidelink DCI (for example, DCI associated with different types Uu and sidelink).

(3) M2 (a positive integer less than or equal to N) pieces of first information in the N pieces of first information correspond to target objects associated with a plurality of pieces of feature information.

The feature information includes at least one of a type and an identifier.

In (3), it can be understood that the M2 pieces of first information correspond to one target object, and the target object is associated with a plurality of pieces of feature information, that is, a plurality of identifiers and/or types.

For example, the target object is scheduling signaling. The control device sends a multi-cDAI and/or a multi-tDAI, that is, jointly indicated sidelink DCI and Uu DCI to obtain a joint number and/or total quantity of the sidelink DCI and the Uu DCI. That is, the related information sent by the control device corresponds to target objects (scheduling signaling) associated with a plurality of pieces of feature information (that is, sidelink and Uu).

Figure 2:
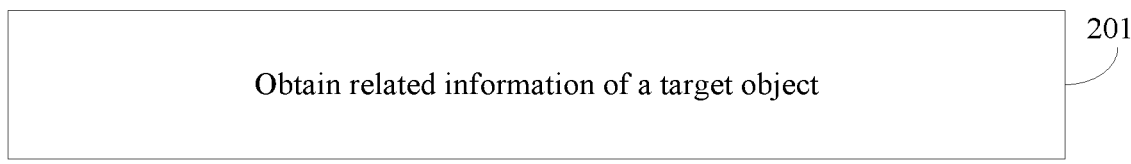
FIG. 2 is a flowchart of another transmission control method according to an embodiment of the present disclosure.

Referring to FIG. 2, FIG. 2 is a flowchart of a transmission control method according to an embodiment of the present disclosure. The method is applied to user equipment. As shown in FIG. 2, the method includes the following steps.

Step 201: Obtain related information of a target object.

The related information of the target object may be obtained by the user equipment through first signaling, configuration information or preconfiguration information, an indication of another user, an agreement in a specification, or the like. For the target object and the related information of the target object, refer to the foregoing content in FIG. 1. Details are not described herein again.

In some embodiments, after step 201, the method may further include at least one of the following:

(1) Determine related information of a first target object.

The first target object is associated with first target feature information. The first target feature information includes at least one of a first target type and a first target identifier.

In (1), for obtained related information of a target object associated with a target type and/or a target identifier, the user equipment may directly determine the obtained related information as related information of the target object.

For example, for an obtained total quantity of pieces of DCI associated with a sidelink RNTI, the UE may directly determine the obtained total quantity as a total quantity of pieces of DCI associated with the sidelink RNTI.

(2) Determine related information of a second target object.

The second target object is associated with a plurality of pieces of feature information. The plurality of pieces of feature information includes at least one of a plurality of types and a plurality of identifiers.

In (2), for obtained related information of target objects associated with a plurality of types and/or a plurality of identifiers, the user equipment may directly determine the obtained related information as joint related information of the target objects.

(3) Determine related information of a third target object based on the determined related information of the second target object.

The third target object is associated with second target feature information. The second target feature information includes at least one of a second target type and a second target identifier. The determining related information of a third target object may be understood as recalculating the related information of the third target object.

For example, if UE obtains a total quantity of pieces of DCI associated with a sidelink RNTI and DCI associated with a Uu RNTI, the UE may recalculate, based on this total quantity, a total quantity of pieces of DCI associated with the sidelink RNTI and a total quantity of pieces of DCI associated with the Uu RNTI.

It should be noted that after the determining the related information of the target object, such as a number and/or a total quantity, the user equipment may locally calculate or maintain or store the number and/or the total quantity as required.

The foregoing identifier, the target identifier, the first target identifier, and the second target identifier all are identifiers of target objects, and may include at least one of the following: an RNTI of a target object (for example, scheduling signaling or transmission), an identifier of a search space corresponding to a target object (for example, scheduling signaling), an identifier of a monitoring location corresponding to a target object (for example, scheduling signaling), a carrier identifier, a resource pool identifier, a user identifier, a source identifier, a destination identifier, a group identifier, a service identifier, a transmission identifier, a QoS identifier, a scrambling code identifier, a sequence identifier, a reference signal identifier, an index identifier, and the like.

The foregoing type, the target type, the first target type, and the second target type all are types of target objects, and may include at least one of the following: a type of transmission of a target object (for example, a type of transmission scheduled by using scheduling signaling), a type of a search space in which a target object (for example, scheduling signaling) is located, a type of a monitoring location in which a target object (for example, scheduling signaling) is located, a carrier type, a resource pool type, a user type, a group type, a service type, a transmission manner type (for example, a transmission manner is one of unicast, broadcast, and multicast, or a transmission manner is one of transmission of one TB at a time, transmission of a plurality of TBs at a time, and transmission of a plurality of CBGs at a time), a resource type (for example, an NR Uu resource, an LTE Uu resource, an NR sidelink resource, or an LTE sidelink resource), and the like.

Further, a process of determining the related information of the third target object in (3) may include at least one of the following:

①. Determine, based on the related information of the second target object and a target category, the related information of the third target object associated with the target category.

For example, if the UE obtains a total quantity associated with transmission and DCI, the UE may recalculate, based on this total quantity and the target category DCI, a total quantity associated with the target category DCI.

②. Determine, based on the related information of the second target object and a target sub-identifier, the related information of the third target object associated with the target sub-identifier.

The target sub-identifier is one or more identifiers of the foregoing second target identifier.

For example, if the UE obtains a total quantity of pieces of DCI associated with a sidelink RNTI and DCI associated with a Uu RNTI, the UE may recalculate, based on this total quantity and the target sub-identifier sidelink RNTI, a total quantity of pieces of DCI associated with the target sub-identifier sidelink RNTI.

Determine, based on the related information of the second target object and a target sub-type, the related information of the third target object associated with the target sub-type.

The target sub-type is one or more types of the foregoing second target type.

For example, if the UE obtains a total quantity of pieces of DCI associated with sidelink transmission and DCI associated with Uu transmission, the UE may recalculate, based on this total quantity and the target sub-type SL, a total quantity of pieces of DCI associated with the target sub-type SL.

In this embodiment of the present disclosure, after step 201, in a process of determining related information of a fourth target object, the method may further include:

performing a first operation in a case that obtained first signaling meets at least one of the following.

The first signaling does not include the related information of the target object associated with the third target feature information; In this case, for example, the first signaling may not include related information of any target object, or the first signaling includes only related information of a target object that is not associated with the third target feature information.

The first signaling is scheduling signaling for scheduling uplink transmission (for example, a PUSCH).

The first operation may include at least one of the following:

not responding to the first signaling, where not responding to the first signaling may be understood as skipping counting the first signaling, that is, skipping processing the related information of the fourth target object based on the first signaling; and keeping the related information of the fourth target object unchanged, that is, skipping processing the related information of the fourth target object, for example, a number and/or a total quantity are/is not increased.

It should be noted that the fourth target object is associated with the third target feature information. The third target feature information may include at least one of a third target type and a third target identifier. In specific implementation, the fourth target object may represent a same object as the first target object or the third target object, but for distinction only, different numbers are used herein.

In addition, in a process of determining related information of a fourth target object, the method may further include:

in a case that obtained first signaling includes related information of a target object associated with third target feature information, performing the following operation: performing corresponding processing on the related information of the fourth target object based on information included in the first signaling.

The corresponding processing may be understood as changing a value indicated by the related information of the fourth target object, for example, increasing by X, and more specifically, increasing a number and/or a total quantity. The first signaling may be obtained through an indication of the control device, configuration, preconfiguration, an indication of another user, an agreement in a specification, and the like.

The obtained first signaling may be sent by the control device, or may be generated based on configuration or preconfiguration.

In some embodiments, after step 201, the method may further include:

determining feedback information based on the obtained related information of the target object and/or the determined related information of the target object.

In some embodiments, the determined related information of the target object may be the foregoing determined related information of at least one of the first target object, the second target object, the third target object, and the fourth target object. The feedback information may be HARQ-ACK information, or may be a codebook or a sub-codebook that needs to be fed back. The feedback information may include feedback information of transmission associated with a target object, for example, at least one of sidelink information corresponding to sidelink transmission, control information of Uu transmission, and the like.

Further, the related information of the target object and/or the related information of the target object that are/is obtained and/or determined by the user equipment may be related to at least one of a size, a type, and content of corresponding feedback information (for example, a codebook or a sub-codebook). The determining feedback information may be: determining at least one of the following of the feedback information:

(1) Size

For sizes, sizes of feedback information corresponding to different target objects in the feedback information are related to corresponding transmission manners. For example, it is determined that sizes of HARQ-ACK information corresponding to different target objects in a codebook or a sub-codebook that needs to be fed back are related to sizes of feedbacks corresponding to corresponding target objects. In this way, sizes of all HARQ-ACK information and sizes of codebooks or sub-codebooks formed by all the HARQ-ACK information may be determined by traversing all related information.

For example, the target object is DCI. Three pieces of DCI sent by the base station indicate numbers of the DCI and a same feedback resource, numbers are 0, 1, and 2 respectively, and the three pieces of DCI are separately used to schedule one TB, two TBs, and ten CBGs. In this case, sizes of corresponding HARQ-ACK information bits are 1 bit, 2 bits, and 10 bits, so that it is determined that a size of final feedback information is 13 bits.

(2) Type

For types, types of feedback information corresponding to different target objects in the feedback information correspond to corresponding target objects. For example, the correspondence may be corresponding to at least one of a category, an identifier, and a type of the target object. For example, when the target object is scheduling signaling, it is determined that a type of a codebook or a sub-codebook that needs to be fed back may be dynamic, that is, a codebook or a sub-codebook whose size changes flexibly. Alternatively, when the target object is a PSFCH resource, it is determined that a type of a codebook or a sub-codebook that needs to be fed back may be semi-static, that is, a codebook or a sub-codebook with a relatively fixed size.

(3) Content

For content, feedback information corresponding to different target objects in the feedback information may be arranged in order of corresponding target objects. For example, the sequence may be a time domain sequence, a frequency domain sequence, or a number sequence. For example, HARQ-ACK information corresponding to different target objects in a codebook or a sub-codebook that needs to be fed back may be arranged in order of numbers of corresponding target objects. In this way, transmission corresponding to each bit in the codebook or the sub-codebook may be determined by determining the numbers of the target objects.

Further, when determining the feedback information based on the obtained related information of the target object and/or the determined related information of the target object, the user equipment in this embodiment of the present disclosure may further:

perform a second operation in a case that any one of the following is met:

first signaling is obtained, but the related information of the target object cannot be obtained based on the first signaling, for example, the first signaling does not carry the related information of the target object;

first signaling is obtained, but the related information of the target object obtained based on the first signaling indicates any one of a special value, a redundant value, an invalid value, and a reserved value;

first signaling is obtained, but it is determined, in at least one of the following manners, that a feedback is disabled (disable): an indication of a control device, an agreement in a specification, preconfigured information, and an indication of other user equipment; and first signaling is obtained, but it is determined, in at least one of the following manners, that a transmission manner is broadcast: an indication of a control device, an agreement in a specification, preconfigured information, and an indication of other user equipment.

In an implementation, for the obtained first signaling, the first signaling carries the related information of the target object, and at least one code point (or at least one indicated value) of the related information is used to indicate that the currently carried related information is any one of a special value, a redundant value, an invalid value, and a reserved value. Further, when calculating the related information of the target object associated with the target sub-type and/or the target sub-identifier, the user equipment does not calculate the related information of the target object. For example, two bits are used in DCI to indicate a number of the DCI, and two bits are used to indicate a total quantity of the DCI. In an implementation, when the number is 11, it indicates that no valid related information is carried in this case. In another implementation, when the total quantity is 11, it indicates that no valid related information is carried in this case. In another implementation, when 4 bits of the number and the total quantity jointly indicate 1111, it indicates that no valid related information is carried in this case.

Further, for example, the base station sends two pieces of DCI for scheduling SL transmission, where the DCI carries a combined total quantity of pieces of DCI for scheduling SL transmission and DCI for scheduling Uu transmission, and a combined number of current DCI. It is assumed that the first DCI indicates that a number of the current DCI is 0, a total quantity of pieces of DCI is 2, and 4 bits of a number and a total quantity that are carried in the second piece of DCI jointly indicate 1111. In this case, when the user equipment separately calculates, based on a transmission type, a number and a quantity of pieces of DCI for scheduling SL transmission, the second piece of DCI is not numbered, and is not included in the total quantity.

In another implementation, for the obtained first signaling, the first signaling may carry the related information of the target object. For example, the first signaling is DCI and the target object is DCI, that is, the DCI carries a number and a total quantity of the DCI.

Further, in at least one of the following conditions, the first signaling may not carry the related information of the target object: The corresponding transmission is broadcast, and the corresponding transmission is unicast, or multicast, but a HARQ feedback is disabled (disable HARQ feedback).

For example, when a HARQ feedback is not required for sidelink transmission scheduled by using DCI, the DCI may not carry related information.

The first signaling may be indicated through an indication of the control device, an agreement in a specification, preconfiguration information, an indication of other user equipment, and the like. The performing a second operation may include at least one of the following:

skipping feeding back transmission corresponding to the first signaling; and determining that the generated feedback information does not include feedback information of the transmission corresponding to the first signaling.

Further, the user equipment in this embodiment of the present disclosure may further: send the obtained related information of the target object and/or the determined related information of the target object to other user equipment.

When the related information is sent to the other user equipment, to facilitate transmission, the related information may be mapped to a certain degree, for example, compressed or expanded to a fixed length.

In some embodiments, the related information sent to the other user equipment may be sent by using second signaling, that is, the obtained related information of the target object and/or the determined related information of the target object are/is sent to the other user equipment by using the second signaling. The second signaling may include at least one of the following: scheduling signaling, higher layer signaling, a system information block, and the like.

For example, the base station may indicate at least one of the following to UE 1 by using DCI: related information of SL DCI, related information of SL transmission, and related information of an SL feedback. The UE 1 indicates the received related information to other UE, such as UE 2, by using SCI, RRC signaling, or another sidelink message.

In some embodiments, the case that the UE 1 indicates the information to the other UE may be: Case 1: The base station indicates that destination UE of the information is the UE 1, and the UE 1 incidentally notifies the other UE. Case 2: The base station indicates that destination UE of the foregoing information is the UE 2. However, the UE 2 may not establish a connection with the base station, and the information is forwarded by using the UE 1. In this case, the UE 1 may be relay (relay) UE.

In an implementation, for example, the control device is a base station. The base station may send different DCI, and separately schedule different types of transmission, for example, Uu transmission and sidelink transmission, where the DCI carries a number and a total quantity of the DCI, and is used to notify the UE of a quantity of pieces of actually sent DCI, to assist the UE to determine a sequence in which HARQ feedback information should be arranged when HARQ feedback information of the transmission is fed back and a size of the feedback information.

Further, DCI for scheduling Uu transmission and DCI for scheduling sidelink transmission may be separately counted. For example, two types of DCI are distinguished by using feature information such as an RNTI, a search space, and/or a monitored location, and numbers and total quantities are separately counted.

And/or DCI for scheduling Uu transmission and DCI for scheduling sidelink transmission may be jointly counted. In addition, after obtaining a result of joint statistics collection, the UE may further recalculate a total quantity and/or a number of a particular type of DCI.

Further, DCI sent by the base station may also be counted and indicated for transmission and a feedback, that is, the DCI indicates a total quantity and a number of the transmission and/or the feedback.

Further, different types of DCI (or transmission or feedbacks) may be indicated in different manners. For example, different types of DCI are separately indicated, or one type of DCI is jointly indicated, and another type of DCI is separately indicated, or joint numbering is performed but a total quantity is separately calculated.

Further, the UE may determine, by using the obtained number and/or total quantity, a quantity of pieces of DCI (or a quantity of times of transmission) sent by the base station, to determine content and a size of feedback information. For example, assuming that DCI i (or transmission) corresponds to Xi bits, X corresponding to all DCI (or transmission) is cascaded in order of numbers to obtain final feedback information (or a codebook).

Further, the UE may determine, by using the obtained number and/or total quantity, a quantity of feedbacks that the base station expects to receive, to determine content and a size of feedback information. For example, if the base station expects to receive Y feedbacks, final feedback information (or a codebook) is obtained through cascading in order of numbers.

The following describes the present disclosure in detail with reference to specific examples 1 to 5.

First, it should be noted that in examples 1 to 5, the first signaling is scheduling signaling, and the target object (category) is scheduling signaling. However, this is not limited thereto. In addition, in this embodiment, the target object may be transmission, a feedback, and/or the like.

Example 1

In example 1, a separate numbering and counting solution is described. Different identifiers of scheduling signaling for scheduling different types of transmission are counted based on identifiers of scheduling signaling. For a specific indication manner, refer to FIG. 3 in example 4-1.

In example 1, the control device sends, to the user equipment, scheduling signaling for scheduling a target type of transmission (for example, the target type of transmission is sidelink transmission). The scheduling signaling for the target type of transmission carries at least related information of the target type of scheduling signaling. Alternatively, the scheduling signaling for the target type of transmission carries related information of a plurality of types of scheduling signaling. For example, a number of DCI for sidelink transmission is carried, and a total quantity of pieces of sidelink DCI and Uu DCI is carried.

In some embodiments, the related information of the target type of scheduling signaling may include at least one of the following parameters:

a number of the scheduling signaling for scheduling the target type of transmission;

a total quantity of pieces of the scheduling signaling for scheduling the target type of transmission; and a ratio j of the total quantity of pieces of the scheduling signaling for scheduling the target type of transmission to K (for example, K=4, total quantity/4=j).

In some embodiments, a method for determining or counting the related information of the scheduling signaling for scheduling the target type of transmission by the control node includes: if an identifier of scheduling signaling on a carrier in a monitoring location is not an identifier of the scheduling signaling for scheduling the target type of transmission, skipping counting the scheduling signaling. In other words, the related information of the scheduling signaling keeps unchanged, or a number and/or a total quantity of pieces of the scheduling signaling are/is not increased.

In some embodiments, after receiving the scheduling signaling for scheduling the target type of transmission and obtaining the related information of the target type of scheduling signaling, the user equipment may determine at least one of the following information based on the information:

(1) A number of the scheduling signaling for scheduling the target type of transmission.

Further, the user equipment may determine that the number is a number of currently received scheduling signaling for scheduling the target type of transmission.

(2) A total quantity of pieces of the scheduling signaling for scheduling the target type of transmission.

Further, the user equipment may determine that the total quantity is a total quantity of pieces of scheduling signaling for scheduling the target type of transmission in a current monitoring location.

(3) A ratio of the total quantity of pieces of the scheduling signaling for scheduling the target type of transmission to K.

In some embodiments, after determining the related information of the scheduling signaling for scheduling the target type of transmission, the user equipment may cascade target information corresponding to the scheduling signaling (for example, sidelink information corresponding to scheduled sidelink transmission) based on the number of the scheduling signaling for scheduling the target type of transmission, and determine a size and/or content of feedback information (for example, a codebook) that needs to be fed back.

In some embodiments, the target type is sidelink, and the target type is an identifier related to sidelink DCI.

Example 2

In example 2, a separate numbering and counting solution is described. A separate monitoring location is configured for scheduling signaling of a target type or a target identifier. Scheduling signaling identifiers of different types of scheduling signaling may be the same or may be different.

1. The control device configures a search space of a target type and/or identifier (for example, a search space (search space) of scheduling signaling for scheduling sidelink). The space may have a specific identifier and/or type.

In some embodiments, the control node separately configures search space for scheduling signaling of inter-RAT sidelink and scheduling signaling of intra-RAT sidelink. Further, monitoring locations of these search spaces do not overlap.

In some embodiments, based on configuration, a monitoring location in a search space of scheduling signaling for sidelink does not overlap a monitoring location in a search space of scheduling signaling for scheduling other transmission.

2. After receiving configuration of a search space of scheduling signaling for scheduling sidelink, the user equipment may determine a monitoring location in the search space of the scheduling signaling for scheduling sidelink.

In some embodiments, the user considers or expects or assumes (expect/assume) that a monitoring location in a search space of scheduling signaling for inter-RAT sidelink does not overlap a monitoring location in a search space of scheduling signaling for intra-RAT sidelink.

In some embodiments, the user considers or expects or assumes (expect/assume) that the monitoring location in the search space of the scheduling signaling for scheduling sidelink does not overlap a monitoring location in a search space of scheduling signaling for scheduling other transmission.

3. Monitoring locations in different search spaces overlap. The overlap may be time domain overlap, frequency domain overlap, Resource Block (RB)/Resource Element (RE) overlap, or the like.

In some embodiments, if a monitoring location in a search space of scheduling signaling for inter-RAT sidelink overlaps a monitoring location in a search space of scheduling signaling for intra-RAT sidelink, the control device may perform the following content:

(1) If identifier information of the scheduling signaling for inter-RAT sidelink is different from identifier information of the scheduling signaling for intra-RAT sidelink (for example, different RNTIs), scheduling signaling in an overlapping part is counted based on identifiers of scheduling signaling.

For example, if the overlapping part is used for the scheduling signaling for inter-RAT sidelink, a number and/or a total quantity corresponding to the scheduling signaling for inter-RAT sidelink are/is increased.

(2) If identifier information of the scheduling signaling for inter-RAT sidelink is the same as identifier information of the scheduling signaling for intra-RAT sidelink (for example, RNTIs are the same), an overlapping monitoring location is invalid, or all scheduling signaling in the monitoring location is not counted.

Alternatively, if identifier information of the scheduling signaling for inter-RAT sidelink is the same as identifier information of the scheduling signaling for intra-RAT sidelink (for example, RNTIs are the same), an overlapping part is invalid, or scheduling signaling in an overlapping part of is not counted, including any one of the following: related information keeps unchanged, the related information is a special value or a redundant value, and the related information is not carried.

For example, if the overlapping part is used to send the scheduling signaling for inter-RAT sidelink, related information of the scheduling signaling for inter-RAT sidelink is the same as related information of a previous piece of scheduling signaling for inter-RAT sidelink in a non-overlapping part, that is, a number and/or a total quantity are/is not increased.

Alternatively, if the overlapping part is used to send the scheduling signaling for scheduling intra-RAT sidelink, related information of the scheduling signaling for intra-RAT sidelink is the same as related information of a previous piece of scheduling signaling for intra-RAT sidelink in a non-overlapping part, that is, a number and/or a total quantity are/is not increased.

Alternatively, if the overlapping part is used to send scheduling signaling corresponding to transmission with a higher priority, related information of the scheduling signaling corresponding to the transmission with the higher priority is the same as related information of a previous piece of scheduling signaling for a same category of transmission in a non-overlapping part, that is, a number and/or a total quantity are/is not increased.

In some embodiments, if a monitoring location in a search space of scheduling signaling for sidelink overlaps a monitoring location in a search space of scheduling signaling for scheduling other transmission, the control device may perform the following:

(1) If identifier information of scheduling signaling for sidelink is different from identifier information of scheduling signaling for other transmission (for example, RNTIs are different), scheduling signaling in an overlapping monitoring location or an overlapping part is counted based on identifiers of scheduling signaling; or scheduling signaling in the monitoring location or the overlapping part is counted.

For example, if the overlapping part is used for the scheduling signaling for sidelink, a number and/or a total quantity corresponding to the scheduling signaling for sidelink are/is increased or changed.

(2) If identifier information of scheduling signaling for sidelink is the same as identifier information of scheduling signaling for other transmission (for example, RNTIs are the same), the monitoring location is invalid, or all scheduling signaling in the monitoring location is not counted.

Alternatively, if identifier information of scheduling signaling for sidelink is the same as identifier information of scheduling signaling for other transmission (for example, RNTIs are the same), an overlapping part is invalid, or scheduling signaling in the overlapping part is not counted.

For example, if the overlapping part is used to send the scheduling signaling for scheduling sidelink, related information of the scheduling signaling for scheduling sidelink is the same as related information of a previous piece of scheduling signaling for scheduling sidelink in a non-overlapping part, that is, a number and/or a total quantity are/is not increased.

Alternatively, if the overlapping part is used to send the scheduling signaling for other transmission, related information of the scheduling signaling for other transmission is the same as related information of a previous piece of scheduling signaling for other transmission in a non-overlapping part, that is, a number and/or a total quantity are/is not increased.

Alternatively, if the overlapping part is used to send scheduling signaling corresponding to transmission with a lower priority, related information of the scheduling signaling corresponding to the transmission with the lower priority is the same as related information of a non-overlapping part of a previous piece of scheduling signaling for a same category of transmission, that is, a number and/or a total quantity do/does not increase.

4. Monitoring locations in different search spaces overlap. The overlap may be time domain overlap, frequency domain overlap, RB/RE overlap, or the like.

In some embodiments, if a monitoring location in a search space of scheduling signaling for inter-RAT sidelink overlaps a monitoring location in a search space of scheduling signaling for intra-RAT sidelink, the user equipment may perform the following:

(1) Scheduling signaling for inter-RAT sidelink in an overlapping part or a monitoring location is ignored, that is, the user equipment does not count the scheduling signaling. In other words, when corresponding sidelink information is determined, the sidelink information does not include sidelink HARQ-ACK information corresponding to the scheduling signaling (and/or scheduled sidelink transmission).

(2) Alternatively, scheduling signaling for scheduling intra-RAT sidelink in an overlapping part or a monitoring location is ignored, that is, the user equipment does not count the scheduling signaling. In other words, when corresponding sidelink information is determined, the sidelink information does not include sidelink HARQ-ACK information corresponding to the scheduling signaling (and/or scheduled sidelink transmission).

(3) Alternatively, scheduling signaling corresponding to transmission with a lower priority in an overlapping part or a monitoring location is ignored, that is, the user equipment does not count the scheduling signaling. In other words, when corresponding sidelink information is determined, the sidelink information does not include sidelink HARQ-ACK information corresponding to the scheduling signaling (and/or scheduled sidelink transmission).

In some embodiments, if a monitoring location in a search space of scheduling signaling for sidelink overlaps a monitoring location in a search space of scheduling signaling for scheduling other transmission, the user equipment may perform the following:

(1) Scheduling signaling for scheduling sidelink in an overlapping part or a monitoring location is ignored, that is, the user equipment does not count the scheduling signaling. In other words, when corresponding sidelink information is determined, the sidelink information does not include sidelink HARQ-ACK information corresponding to the scheduling signaling (and/or scheduled sidelink transmission).

(2) Alternatively, scheduling signaling for scheduling other transmission in an overlapping part or a monitoring location is ignored, that is, the user equipment does not count the scheduling signaling. In other words, when corresponding sidelink information is determined, the sidelink information does not include sidelink HARQ-ACK information corresponding to the scheduling signaling (and/or scheduled sidelink transmission).

(3) Alternatively, scheduling signaling corresponding to transmission with a lower priority in an overlapping part or a monitoring location is ignored, that is, the user equipment does not count the scheduling signaling. In other words, when corresponding sidelink information is determined, the sidelink information does not include sidelink HARQ-ACK information corresponding to the scheduling signaling (and/or scheduled sidelink transmission).

5. After determining the related information of the scheduling signaling of the search space associated with the target type and/or identifier, the user equipment may cascade target information corresponding to the scheduling signaling (for example, sidelink information corresponding to scheduled sidelink transmission) based on the number of the scheduling signaling for scheduling the target type of transmission, to determine a size and/or content of feedback information (for example, a codebook) that needs to be fed back.

Example 3

In example 3, a joint numbering and counting solution is described. Different types of scheduling signaling are jointly counted, and related information is recalculated on the user equipment side. For a specific indication manner, refer to FIG. 6 in the following example 4-3.

In example 3, the control device may jointly indicate scheduling signaling associated with different types and/or identifiers. For example, a number and a total quantity of pieces of scheduling signaling for scheduling sidelink transmission and a number and a total quantity of pieces of scheduling signaling for scheduling Uu transmission are jointly indicated.

Further, the control device enables the foregoing joint related information to be carried in the scheduling signaling.

Further, after obtaining the related information of the scheduling signaling, the user equipment may determine a number and/or a total quantity of pieces of received scheduling signaling. For example, the user equipment may recalculate (determine) related information of scheduling signaling associated with a target type and/or identifier based on the obtained related information of the scheduling signaling.

Further, the re-calculating (determining) related information of scheduling signaling associated with a target type and/or identifier may include at least one of the following:

(1) Scheduling Signaling Associated with a Target Sub-Identifier is Counted Based on the Target Sub-Identifier.

The target sub-identifier is one or more identifiers of the target identifier. In some embodiments, the target identifier may be at least one of the following: an RNTI of scheduling signaling, an identifier of a search space corresponding to scheduling signaling, an identifier of a monitoring location corresponding to scheduling signaling, a carrier identifier, a resource pool identifier, a user identifier, a source identifier, a destination identifier, a group identifier, a service identifier, a transmission identifier, a QoS identifier, a scrambling code identifier, a sequence identifier, a reference signal identifier, and an index identifier.

For example, the user equipment may calculate, based on a sidelink RNTI, a number and/or a total quantity of scheduling signaling for scheduling sidelink transmission.

(2) Scheduling Signaling Associated with a Target Sub-Type is Counted Based on the Target Sub-Type.

The target sub-type is one or more types of the target type. In some embodiments, the target type may be at least one of the following: a type of scheduled transmission, a type of a search space corresponding to scheduling signaling (for example, a type of a search space in which scheduling signaling is located), a type of a monitoring location, a carrier type, a resource pool type, a user type, a group type, a service type, a transmission manner type (for example, a transmission manner is one of unicast, broadcast, and multicast, or a transmission manner is one of transmission of one TB at a time, transmission of a plurality of TBs at a time, and transmission of a plurality of CBGs at a time), and a resource type (for example, an NR Uu resource, an LTE Uu resource, an NR sidelink resource, or an LTE sidelink resource, or more specifically, a PDSCH or a PSSCH, or a PDCCH or a PSCCH).

For example, the user equipment may calculate, based on a type of scheduled transmission, a number and/or a total quantity of scheduling signaling for scheduling sidelink transmission.

Further, in a process of re-calculating (determining) the related information of the scheduling signaling associated with the target type and/or identifier, the user equipment may perform at least one of the following:

(1) For received scheduling signaling that is not associated with the target type, the scheduling signaling is not counted, or the related information of the scheduling signaling associated with the target type keeps unchanged, for example, a number and/or a total quantity are/is not increased.

And/or for received scheduling signaling that is not associated with the target identifier, the scheduling signaling is not counted, or the related information of the scheduling signaling associated with the target identifier keeps unchanged, for example, a number and/or a total quantity are/is not increased.

For example, when the user equipment counts a number and/or a total quantity of pieces of scheduling signaling for scheduling sidelink transmission, if received scheduling signaling is not used for scheduling sidelink transmission, the scheduling signaling is not counted, and the number and/or the total quantity of pieces of scheduling signaling for scheduling sidelink transmission keep/keeps unchanged.

(2) For received scheduling signaling that is associated with the target type, the scheduling signaling is counted, or X is added to the related information of the scheduling signaling associated with the target type, for example, a number and/or a total quantity are/is increased.

And/or for received scheduling signaling that is associated with the target identifier, the scheduling signaling is counted, or X is added to the related information of the scheduling signaling associated with the target identifier, for example, a number and/or a total quantity are/is increased.

For example, when the user equipment counts a number and/or a total quantity of pieces of scheduling signaling for scheduling sidelink transmission, if received scheduling signaling is used for scheduling sidelink transmission, the user equipment counts the scheduling signaling, and the number and/or the total quantity of pieces of scheduling signaling for scheduling sidelink transmission are/is increased.

In some embodiments, after determining (for example, recalculating) the related information of the scheduling signaling associated with the target type and/or identifier, the user equipment may cascade target information corresponding to the scheduling signaling (for example, sidelink information corresponding to scheduled sidelink transmission) based on the number of the scheduling signaling for scheduling the target type of transmission, to determine a size and/or content of feedback information (for example, a codebook) that needs to be fed back.

Example 4

In example 4, a separate or joint indication manner is described. In example 4, DCI for scheduling SL transmission is referred to as SL DCI, and DCI for scheduling Uu transmission is referred to as Uu DCI. Examples 4-1 to 4-4 are separately used for detailed description below. It should be noted that numbering herein starts from 1, but this embodiment of the present disclosure is not limited thereto. For example, numbering may start from 0 (numbering in some of the foregoing embodiments starts from 0).

In the following examples 4-1 to 4-4, content in parentheses in the accompanying drawings respectively represents numbers and total quantities. For example, if content in parentheses are shown as (A, B), A represents a number and B represents a total quantity.

In example 4-1, numbers and total quantities of pieces of scheduling signaling of different identifiers and/or types are separately indicated.

Figure 3:
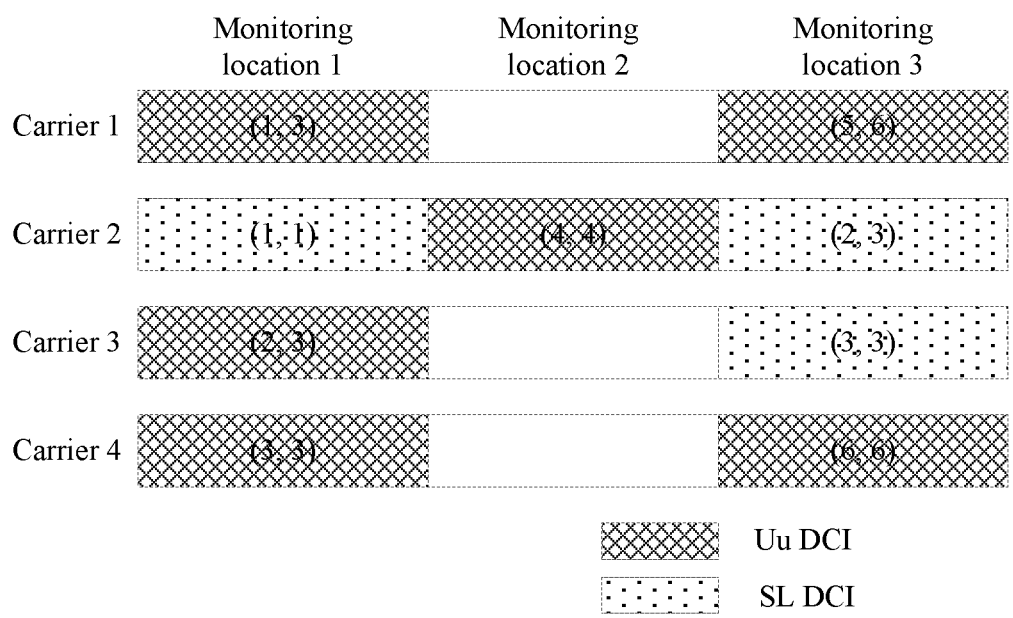
FIG. 3 is a first schematic diagram of an indication manner of related information according to an embodiment of the present disclosure.

As shown in FIG. 3, separate numbers and separate total quantities of pieces of SL DCI and Uu DCI are indicated, the separate numbers and the separate total quantities are carried in the SL DCI, and the separate numbers and the separate total quantities are carried in the Uu DCI. It can be learned from FIG. 3 that the control device sends a total of nine pieces of DCI, where six pieces of Uu DCI numbered 1 to 6 are sent, and three pieces of SL DCI numbered 1 to 3 are sent. In this case, because a number and a total quantity of pieces of the Uu DCI is separately indicated, a corresponding advantage is that introduction and loss of the SL DCI do not affect an indication of the Uu DCI.

It can be understood that, the example shown in FIG. 3 is described by using a case that related information carried in the SL DCI and the Uu DCI includes a total quantity and a number. In addition, there may be actually any one of the following cases:

(1) The related information carried in the SL DCI includes only a total quantity, and the related information carried in the Uu DCI includes a total quantity and a number.
(2) The related information carried in the SL DCI includes a total quantity and a number, and the related information carried in the Uu DCI includes only a total quantity.
(3) The related information carried in the SL DCI includes a total quantity, and the related information carried in the Uu DCI includes a number.
(4) The related information carried in the SL DCI includes a number, and the related information carried in the Uu DCI includes a total quantity.

In example 4-2, numbers of scheduling signaling of different identifiers and/or types are separately indicated, and a total quantity are jointly indicated.

Case 1: Only SL DCI carries a number that is of scheduling signaling and that is separately indicated and a total quantity that is jointly indicated, and Uu DCI still carries a number that is of scheduling signaling and that is separately indicated and a total quantity that is separately indicated (that is, keeps the manner in the related art).

Figure 4:
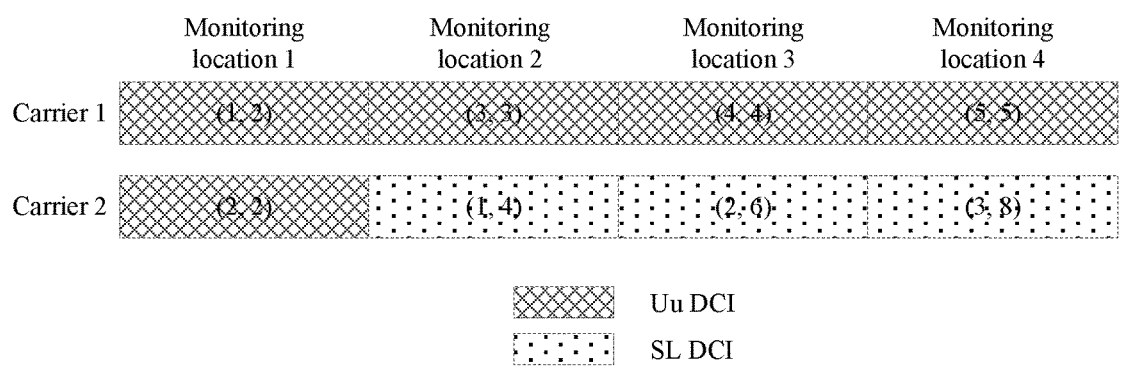
FIG. 4 is a second schematic diagram of an indication manner of related information according to an embodiment of the present disclosure.

As shown in FIG. 4, separate numbers and separate total quantities of pieces of SL DCI and Uu DCI are indicated, a total quantity of pieces of SL DCI and Uu DCI are jointly indicated, the separate numbers and the joint total quantity are carried in the SL DCI, and the separate numbers and the independent total quantities are carried in the Uu DCI. It can be learned from FIG. 4 that the control device sends a total of five pieces of Uu DCI numbered 1 to 5, and sends three pieces of SL DCI numbered 1 to 3.

In this case, because a number and a total quantity of pieces of the Uu DCI is separately indicated, a corresponding advantage is that introduction, indication, and loss of the SL DCI do not affect an indication of the Uu DCI. In addition, in a case that the last piece of Uu DCI (5, 5) is lost, the user equipment may learn, based on received SL DCI (3, 8), that a total of eight pieces of DCI are sent, and compare the received DCI with SL DCI (2, 6) as to determine that one piece of Uu DCI is lost. Therefore, another advantage of the method is that scheduling indication information of SL DCI may help the user equipment determine how many pieces of DCI are lost and which pieces of Uu DCI are lost, and further help the user equipment determine uplink control information or a codebook corresponding to Uu transmission, thereby improving reliability of Uu transmission and reducing complexity of Uu transmission.

It can be understood that, the example shown in FIG. 4 is described by using a case that related information carried in the SL DCI and the Uu DCI includes a total quantity and a number. In addition, there may be actually any one of the following cases:
(1) The related information carried in the SL DCI includes only a total quantity, and the related information carried in the Uu DCI includes a total quantity and a number.
(2) The related information carried in the SL DCI includes a total quantity and a number, and the related information carried in the Uu DCI includes only a total quantity.
(3) The related information carried in the SL DCI includes a total quantity, and the related information carried in the Uu DCI includes a number.
(4) The related information carried in the SL DCI includes a number, and the related information carried in the Uu DCI includes a total quantity.

Case 2: Both SL DCI and Uu DCI carry a number that is of scheduling signaling and that is separately indicated, and a total quantity is jointly indicated.

Figure 5:
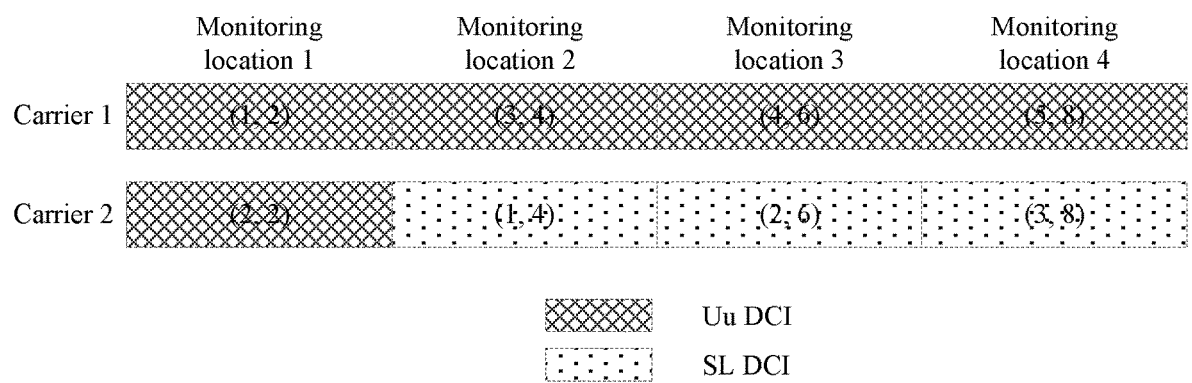
FIG. 5 is a third schematic diagram of an indication manner of related information according to an embodiment of the present disclosure.

As shown in FIG. 5, SL DCI and Uu DCI are separately numbered, a total quantity of pieces of SL DCI and Uu DCI is jointly indicated, the separate numbers and the joint total quantity are carried in the SL DCI, and the separate numbers and the joint total quantity are carried in the Uu DCI. It can be learned from FIG. 5 that the control device sends a total of five pieces of Uu DCI numbered 1 to 5, and sends three pieces of SL DCI numbered 1 to 3.

In this case, in a case that the last piece of SL DCI (3, 8) is lost, the user equipment may learn, based on last received DCI, namely, Uu DCI (5, 8), that a total of eight pieces of DCI are sent, to determine that one piece of DCI is lost. Therefore, an advantage of the method is that scheduling indication information of DCI may help the user equipment determine how many pieces of DCI are lost, and further help the user equipment determine sidelink information corresponding to SL transmission and/or uplink control information corresponding to Uu transmission, thereby improving reliability of transmission and reducing complexity of transmission.

It can be understood that, the example shown in FIG. 5 is described by using a case that related information carried in the SL DCI and the Uu DCI includes a total quantity and a number. In addition, there may be actually any one of the following cases:
(1) The related information carried in the SL DCI includes only a total quantity, and the related information carried in the Uu DCI includes a total quantity and a number.
(2) The related information carried in the SL DCI includes a total quantity and a number, and the related information carried in the Uu DCI includes only a total quantity.
(3) The related information carried in the SL DCI includes a total quantity, and the related information carried in the Uu DCI includes a number.
(4) The related information carried in the SL DCI includes a number, and the related information carried in the Uu DCI includes a total quantity.

Figure 6:
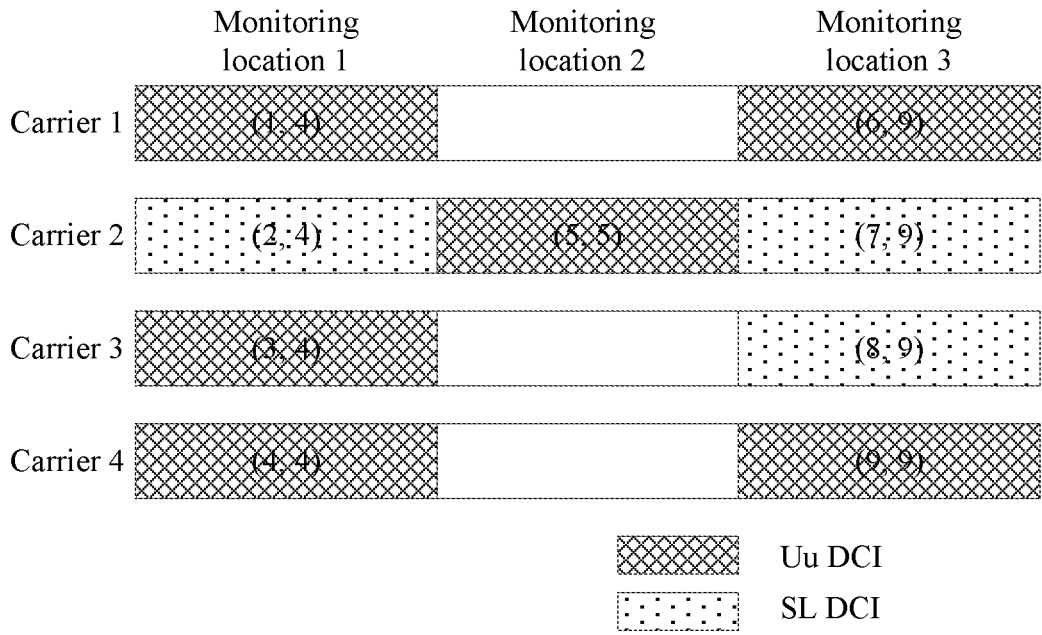
FIG. 6 is a fourth schematic diagram of an indication manner of related information according to an embodiment of the present disclosure.

In example 4-3, as shown in FIG. 6, numbers and a total quantity of pieces of scheduling signaling of different identifiers and/or types are jointly indicated, SL DCI and Uu DCI are separately numbered and jointly indicated, the joint number and the joint total quantity are carried in the SL DCI, and the joint number and the joint total quantity are carried in the Uu DCI. It can be learned from FIG. 6 that the control device sends a total of nine pieces of DCI, where six pieces of Uu DCI numbered 1, 3, 4, 5, 6, and 9 are sent, and three pieces of SL DCI numbered 2, 7, and 8 are sent. In this case, an advantage of the method is that numbers and total quantities of pieces of scheduling signaling of different identifiers and/or types are jointly indicated, and the method is simple.

It can be understood that, the example shown in FIG. 6 is described by using a case that related information carried in the SL DCI and the Uu DCI includes a total quantity and a number. In addition, there may be actually any one of the following cases:
(1) The related information carried in the SL DCI includes only a total quantity, and the related information carried in the Uu DCI includes a total quantity and a number.
(2) The related information carried in the SL DCI includes a total quantity and a number, and the related information carried in the Uu DCI includes only a total quantity.

(3) The related information carried in the SL DCI includes a total quantity, and the related information carried in the Uu DCI includes a number.
(4) The related information carried in the SL DCI includes a number, and the related information carried in the Uu DCI includes a total quantity.

In example 4-4, a special case that DCI for scheduling a PUSCH (UL DAI) is described.

Figure 7:
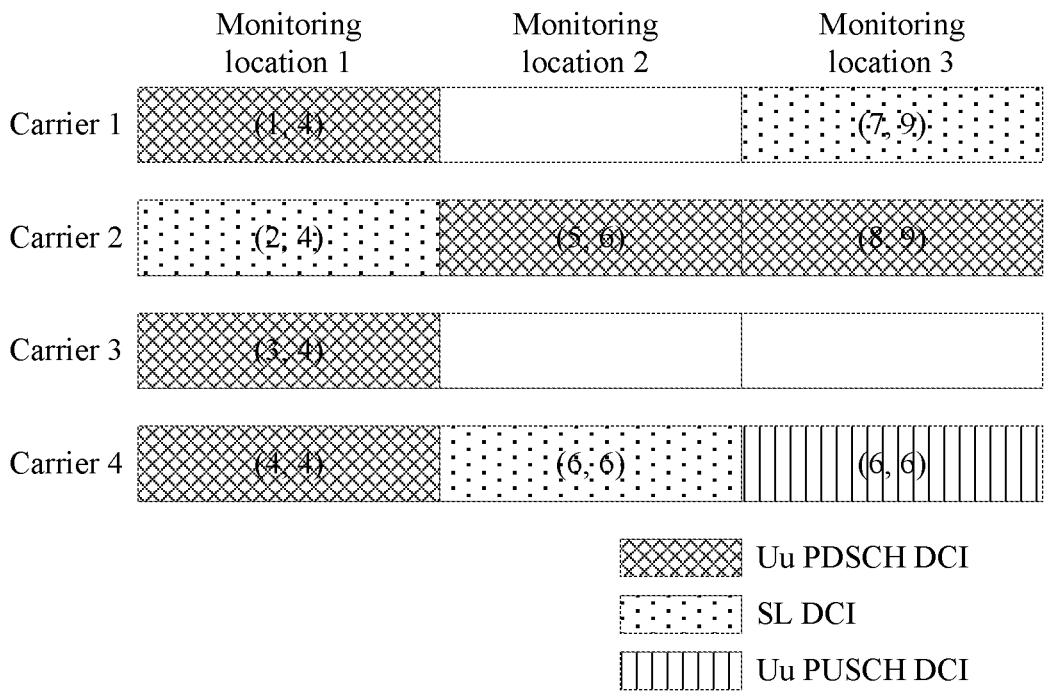
FIG. 7 is a fifth schematic diagram of an indication manner of related information according to an embodiment of the present disclosure.

As shown in FIG. 7, SL DCI and Uu DCI for scheduling Uu PDSCH transmission (assumed to be referred to as Uu PDSCH DCI) are jointly numbered and jointly indicated, a joint number and a joint total quantity are carried in the SL DCI, and the joint number and the joint quantity are carried in the Uu DCI for scheduling Uu PDSCH transmission. For Uu DCI for scheduling Uu PUSCH transmission (assumed to be referred to as Uu PUSCH DCI), a number and a total quantity of pieces of Uu DCI for scheduling Uu transmission are indicated (that is, a joint number and a joint total quantity of Uu PDSCH DCI and Uu PUSCH DCI are carried). It can be learned from FIG. 7 that the control device sends a total of 9 pieces of DCI, where six pieces of Uu DCI are sent, numbers of DCI for scheduling Uu PDSCH transmission are 1, 3, 4, 5, and 8, and a number of DCI for scheduling Uu PUSCH transmission is 6; and three pieces of SL DCI numbered 2, 6, and 7 are sent.

In this case, an advantage of the method is that if SL DCI (7, 9) and DCI (8, 9) for scheduling a Uu PDSCH are lost, but DCI (6, 6) for scheduling a Uu PUSCH is received, a total of six pieces of Uu DCI may still be sent to help the user equipment determine how many pieces of Uu DCI are lost, and further help the user equipment determine uplink control information corresponding to Uu transmission, thereby improving reliability of Uu transmission and reducing impact of sidelink scheduling on Uu.

It can be understood that, the example shown in FIG. 7 is described by using a case that related information carried in the SL DCI and the Uu DCI includes a total quantity and a number. In addition, there may be actually any one of the following cases:
(1) The related information carried in the SL DCI includes only a total quantity, and the related information carried in the Uu DCI includes a total quantity and a number.
(2) The related information carried in the SL DCI includes a total quantity and a number, and the related information carried in the Uu DCI includes only a total quantity.
(3) The related information carried in the SL DCI includes a total quantity, and the related information carried in the Uu DCI includes a number.
(4) The related information carried in the SL DCI includes a number, and the related information carried in the Uu DCI includes a total quantity.

It should be noted that for ease of understanding, a modulo operation is not performed on the number and the total quantity in the foregoing example. Actually, a modulo operation may be performed on the number and the total quantity when the number and the total quantity are indicated, and a value obtained after the modulo operation is indicated in the scheduling signaling. This case is not excluded in this embodiment of the present disclosure. Further, modulus during the modulo operation may be the same or different for scheduling signaling of different types and/or identifiers or for different related information. For example, mod 4 processing is performed on a cDAI and mod 6 processing is performed on a tDAI.

In addition, in the foregoing example, for ease of understanding, when a number and a total quantity are calculated, a frequency domain location is considered (for example, a carrier is traversed first), and a time domain location is considered (for example, a monitoring opportunity is traversed first). Actually, frequency domain is processed before time domain, and a given time range is used for time domain, for example, a monitoring opportunity in a period of a search space is traversed.

Example 5

In example 5, indication manners of different target objects are described. In an example in which the first signaling is scheduling signaling for scheduling SL and the target object is the scheduling signaling for scheduling SL, related information carried in the scheduling signaling for scheduling SL may include at least one of the following:
(1) Related Information of the Scheduling Signaling For example, the related information of the scheduling signaling is a total quantity and/or a number of the scheduling signaling.

For example, when related information of scheduling signaling for scheduling sidelink transmission is separately indicated, the control device sends four pieces of scheduling signaling for scheduling sidelink transmission, a total quantity of these pieces of scheduling signaling is 4, and numbers are 1, 2, 3, and 4 respectively.

It can be learned that based on this method, the user equipment may determine, based on the received related information, scheduling signaling for scheduling sidelink transmission, to determine a size and/or content of feedback information (a codebook) corresponding to scheduled transmission.
(2) Related Information of Sidelink Transmission For example, the related information of sidelink transmission is a total quantity and/or a number of scheduled sidelink transmission.

For example, when the related information of sidelink transmission is separately indicated, the control device sends four pieces of scheduling signaling for scheduling sidelink transmission, and the scheduling signaling is separately used to schedule one time of sidelink transmission, one time of sidelink transmission, two times of sidelink transmission, and two times of sidelink transmission. A total quantity of times of sidelink transmission is 6, and numbers are 1, 2, 3, 4, 5, and 6 respectively.

It can be learned that based on this method, the user equipment may determine sidelink transmission based on the received related information, to determine a size and/or content of feedback information (a codebook) corresponding to the transmission.
(3) Related Information of a Sidelink Feedback For example, the related information of the sidelink feedback is a total quantity and/or a number of the sidelink feedback.

For example, when the related information of the sidelink feedback is separately indicated, the control device sends four pieces of scheduling signaling for scheduling sidelink transmission, and each piece of scheduling signaling is used to schedule one time of sidelink transmission, and these times of transmission are all multicast transmission, and a NACK only feedback manner or a connectionless feedback manner is used, that is, each time of transmission corresponds to feedback information of 1 bit. A total quantity of sidelink feedbacks is 4, and numbers are 1, 2, 3, and 4 respectively.

It can be learned that based on this method, the user equipment may determine a sidelink feedback corresponding to sidelink transmission based on the received related information, to determine a size and/or content of corresponding feedback information (a codebook).

(4) Related Information of a Sidelink Feedback

For example, the related information of the sidelink feedback is a total quantity and/or a number of the sidelink feedback.

For example, when the related information of the sidelink feedback is separately indicated, the control device sends four pieces of scheduling signaling for scheduling sidelink transmission, and each piece of scheduling signaling is used to schedule one time of sidelink transmission, and these times of transmission are all multicast transmission, and an ACK/NACK feedback manner or a connection-based feedback manner is used, that is, the transmission corresponds to feedback information of 2 bits, feedback information of 3 bits, feedback information of 2 bits, and feedback information of 3 bits. A total quantity of sidelink feedbacks is 10, and numbers are 1 to 10 respectively.

It can be learned that based on this method, the user equipment may determine a sidelink feedback corresponding to sidelink transmission based on the received related information, to determine a size and/or content of corresponding feedback information (a codebook).

It should be noted that the scheduling signaling for scheduling SL, that is, the first signaling, may carry related information of different categories of target objects, for example, a number and/or a total quantity of scheduling signaling, and a number and/or a total quantity of a feedback.

The foregoing embodiment describes the transmission control method in the present disclosure. The following describes the control device and the user equipment in the present disclosure with reference to the embodiments and the accompanying drawings.

Figure 8:
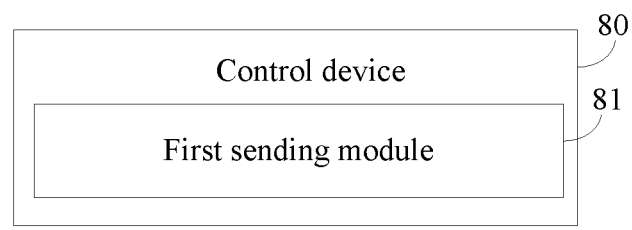
FIG. 8 is a schematic structural diagram of a control device according to an embodiment of the present disclosure.

Referring to FIG. 8, FIG. 8 is a schematic structural diagram of a control device according to an embodiment of the present disclosure. As shown in FIG. 8, the control device 80 includes:
- a first sending module 81, configured to send first information, where
- the first information is related information of a target object, and the related information includes at least one of the following: a number, a total quantity, and a ratio of the total quantity to a preset value; and
- a category of the target object includes at least one of the following:
- scheduling signaling, transmission, a feedback, a reference signal, and a sequence.

In some embodiments, an indication manner of the first information includes at least one of the following:
- separately indicating target objects with different categories based on categories;
- separately indicating target objects associated with different identifiers based on identifiers;
- separately indicating target objects associated with different types based on types;
- jointly indicating target objects with different categories;
- jointly indicating target objects with a plurality of types; and
- jointly indicating target objects with a plurality of identifiers.

In some embodiments, the identifier includes at least one of the following:
- a radio network temporary identifier of a target object, an identifier of a search space corresponding to a target object, an identifier of a monitoring location corresponding to a target object, a carrier identifier, a resource pool identifier, a user identifier, a source identifier, a destination identifier, a group identifier, a service identifier, a transmission identifier, a quality of service identifier, a scrambling code identifier, a sequence identifier, a reference signal identifier, and an index identifier.

In some embodiments, the type includes at least one of the following:
- a type of transmission of a target object, a type of a search space in which a target object is located, a type of a monitoring location in which a target object is located, a carrier type, a resource pool type, a user type, a group type, a service type, a transmission manner type (for example, a transmission manner is one of unicast, broadcast, and multicast, or a transmission manner is one of transmission of one TB at a time, transmission of a plurality of TBs at a time, and transmission of a plurality of CBGs at a time), and a resource type (for example, an NR Uu resource, an LTE Uu resource, an NR sidelink resource, or an LTE sidelink resource).

In some embodiments, when the first information corresponds to at least one target object, each target object is associated with one or more identifiers; and/or each target object is associated with one or more types.

In some embodiments, an indication manner of the first information includes at least one of the following:
- using different indication manners for different related information of target objects, where the different indication manners include a joint indication manner and a separate indication manner; and indicating a target object in a valid monitoring location.

In some embodiments, in a case that N pieces of first information are sent, in the N pieces of first information:
- target objects corresponding to M1 pieces of first information are associated with different feature information;
- and/or
- M2 pieces of first information correspond to target objects associated with a plurality of pieces of feature information, where
- N is an integer greater than or equal to 1, M1 and M2 are integers less than or equal to N, and the feature information includes at least one of a type and an identifier.

In some embodiments, in a case that the target objects corresponding to the M1 pieces of first information are associated with different feature information, first signaling associated with first feature information includes related information of a target object associated with the first feature information; and the first feature information includes at least one of a first type and a first identifier.

In some embodiments, the first signaling associated with the first feature information further includes:
- related information of a target object associated with second feature information;
- and
- the second feature information includes at least one of at least one second type and at least one second identifier.

In some embodiments, the first sending module 81 is specifically configured to send the first information by using first signaling, where the first signaling includes at least one of the following: scheduling signaling, higher layer signaling, and a system information block.

In some embodiments, in a case that the first signaling is scheduling signaling for scheduling a PUSCH, the first information is related information associated with Uu transmission; or in a case that the first signaling is scheduling signaling for scheduling a PSSCH, the first information is related information associated with SL transmission.

In some embodiments, the first signaling includes indication information, and the indication information is used to indicate whether the first signaling includes the first information.

It can be understood that the control device 80 in this embodiment of the present disclosure can implement the processes implemented in the method embodiment shown in FIG. 1, and a same beneficial effect is achieved. To avoid repetition, details are not described herein again.

Figure 9:
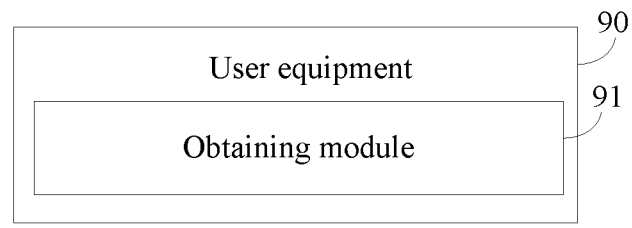
FIG. 9 is a first schematic structural diagram of user equipment according to an embodiment of the present disclosure.

Referring to FIG. 9, FIG. 9 is a schematic structural diagram of user equipment according to an embodiment of the present disclosure. As shown in FIG. 9, the user equipment 90 includes:
- an obtaining module 91, configured to obtain related information of a target object, where
- the related information includes at least one of the following:
- a number, a total quantity, and a ratio of the total quantity to a preset value; and
- a category of the target object includes at least one of the following:
- scheduling signaling, transmission, a feedback, a reference signal, and a sequence.

In some embodiments, the user equipment 90 further includes:
- a first determining module, configured to perform at least one of the following:
- determining related information of a first target object; and
- determining related information of a second target object, where
- the first target object is associated with first target feature information, and the first target feature information includes at least one of a first target type and a first target identifier; and
- the second target object is associated with a plurality of pieces of feature information, and the plurality of pieces of feature information includes at least one of a plurality of types and a plurality of identifiers.

In some embodiments, the first determining module may be further configured to:
- determine related information of a third target object based on the related information of the second target object, where
- the third target object is associated with second target feature information, and the second target feature information includes at least one of a second target type and a second target identifier.

In some embodiments, the first determining module may be further configured to perform at least one of the following:
- determining, based on the related information of the second target object and a target category, the related information of the third target object associated with the target category;
- determining, based on the related information of the second target object and a target sub-identifier, the related information of the third target object associated with the target sub-identifier; and
- determining, based on the related information of the second target object and a target sub-type, the related information of the third target object associated with the target sub-type, where the target sub-identifier is one or more identifiers in the second target identifier, and the target sub-type is one or more types in the second target type.

In some embodiments, the first target identifier or the second target identifier includes at least one of the following:
- a radio network temporary identifier of a target object, an identifier of a search space corresponding to a target object, an identifier of a monitoring location corresponding to a target object, a carrier identifier, a resource pool identifier, a user identifier, a source identifier, a destination identifier, a group identifier, a service identifier, a transmission identifier, a quality of service identifier, a scrambling code identifier, a sequence identifier, a reference signal identifier, and an index identifier.

In some embodiments, the first target type or the second target type includes at least one of the following: a type of transmission associated with a target object, a type of a search space in which a target object is located, a type of a monitoring location in which a target object is located, a carrier type, a resource pool type, a user type, a group type, a service type, a transmission manner type (for example, a transmission manner is one of unicast, broadcast, and multicast, or a transmission manner is one of transmission of one TB at a time, transmission of a plurality of TBs at a time, and transmission of a plurality of CBGs at a time), and a resource type (for example, an NR Uu resource, an LTE Uu resource, an NR sidelink resource, or an LTE sidelink resource).

In some embodiments, the user equipment 90 further includes:
- a first execution module, configured to: in a process of determining related information of a fourth target object, perform a first operation in a case that obtained first signaling meets at least one of the following:
- the first signaling does not include related information of a target object associated with third target feature information; and
- the first signaling is scheduling signaling for scheduling uplink transmission, where
- the performing a first operation includes at least one of the following:
- not responding to the first signaling; and
- keeping the related information of the fourth target object unchanged.

In some embodiments, the user equipment 90 further includes:
- a second execution module, configured to: in a process of determining related information of a fourth target object, in a case that obtained first signaling includes related information of a target object associated with third target feature information, perform corresponding processing on the related information of the fourth target object based on information included in the first signaling.

The third target feature information includes at least one of a third target type and a third target identifier, and the fourth target object is associated with the third target feature information.

In some embodiments, the user equipment 90 further includes:
- a second determining module, configured to determine feedback information based on the obtained related information of the target object and/or the determined related information of the target object.

In some embodiments, the second determining module is further configured to determine at least one of the following of the feedback information:
- a size, a type, and content.

In some embodiments, sizes of feedback information corresponding to different target objects in the feedback information are related to corresponding transmission manners; and/or types of feedback information corresponding to different target objects in the feedback information correspond to types of corresponding target objects; and/or feedback information corresponding to different target objects in the feedback information is arranged in order of numbers of corresponding target objects.

In some embodiments, the user equipment 90 further includes:

a third execution module, configured to perform a second operation in a case that any one of the following is met:

first signaling is obtained, but the related information of the target object cannot be obtained based on the first signaling;

first signaling is obtained, but the related information of the target object obtained based on the first signaling indicates any one of a special value, a redundant value, an invalid value, and a reserved value;

first signaling is obtained, but it is determined, in at least one of the following manners, that a feedback is disabled: an indication of a control device, an agreement in a specification, preconfigured information, and an indication of other user equipment; and first signaling is obtained, but it is determined, in at least one of the following manners, that a transmission manner is broadcast: an indication of a control device, an agreement in a specification, preconfigured information, and an indication of other user equipment, where the performing a second operation includes at least one of the following:

skipping feeding back transmission corresponding to the first signaling; and determining that the generated feedback information does not include feedback information of the transmission corresponding to the first signaling.

In some embodiments, the user equipment 90 further includes:

a second sending module, configured to send the obtained related information of the target object and/or the determined related information of the target object to other user equipment.

In some embodiments, the second sending module is specifically configured to:

send the obtained related information of the target object and/or the determined related information of the target object to the other user equipment by using second signaling, where the second signaling includes at least one of the following:

scheduling signaling, higher layer signaling, and a system information block.

It can be understood that the user equipment 90 in this embodiment of the present disclosure can implement the processes implemented in the method embodiment shown in FIG. 2, and a same beneficial effect is achieved. To avoid repetition, details are not described herein again.

An embodiment of the present disclosure further provides a communications device, including a processor, a memory, and a computer program that is stored in the memory and that can be run on the processor. When the computer program is executed by the processor, the processes of the foregoing transmission control method embodiment are implemented and a same technical effect can be achieved. To avoid repetition, details are not described herein again. In some embodiments, the communications device may be the foregoing control device or user equipment.

Figure 10:
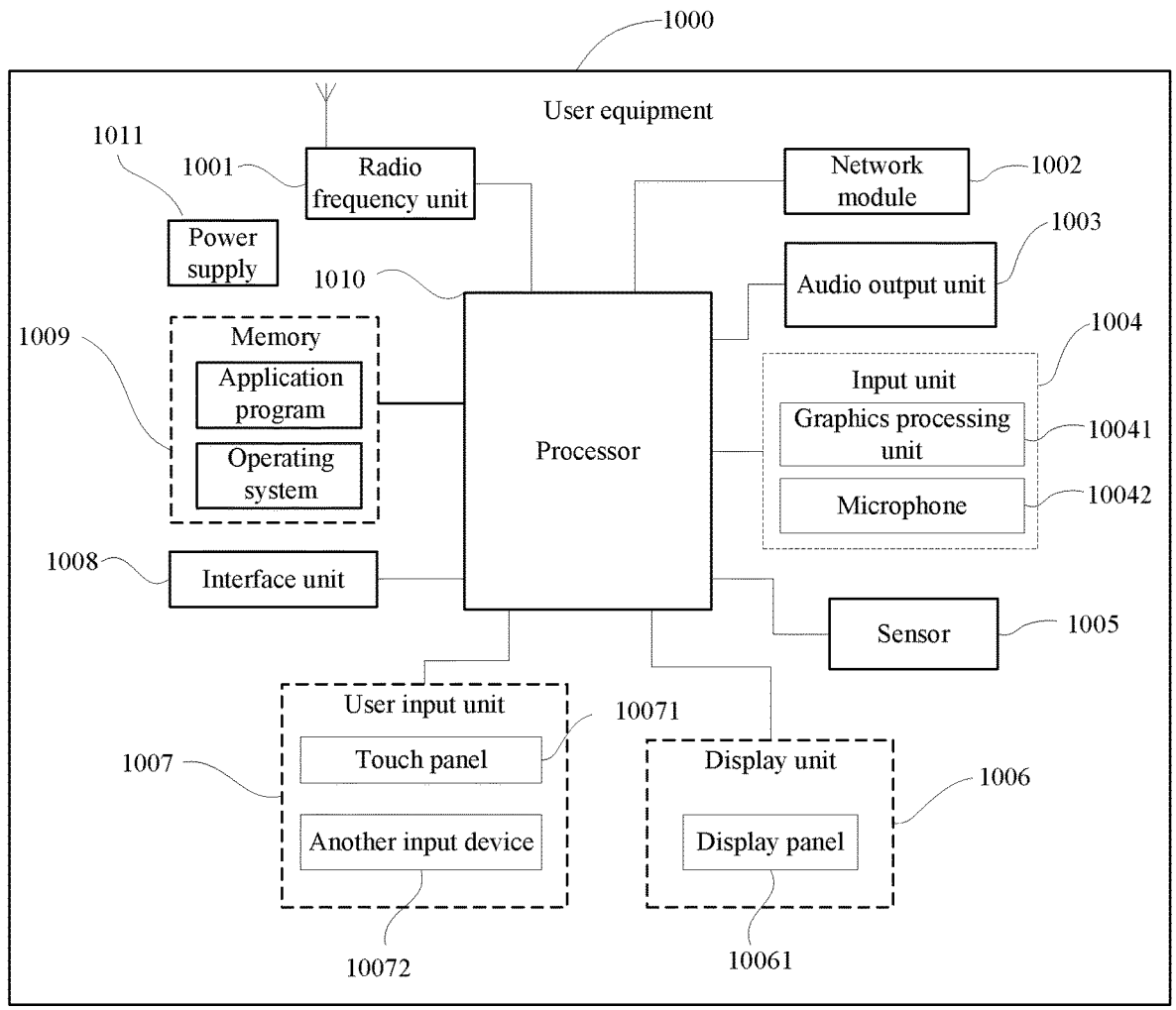
FIG. 10 is a second schematic structural diagram of user equipment according to an embodiment of the present disclosure.

Referring to FIG. 10, FIG. 10 is a schematic diagram of a hardware structure of a terminal for implementing the embodiments of the present disclosure. User equipment 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art can understand that the structure shown in FIG. 10 does not constitute a limitation to the user equipment 1000, and the user equipment 1000 may include more or fewer components than those shown in the figure, or combine some components, or have a different component arrangement. In this embodiment of the present disclosure, the terminal includes but is not limited to a mobile phone, a tablet computer, a notebook computer, a palmtop computer, an in-vehicle terminal, a wearable device, a pedometer, and the like.

In some embodiments, when the user equipment 1000 is a control device (for example, a control device in sidelink transmission), the radio frequency unit 1001 is configured to send first information.

The first information is related information of a target object, and the related information includes at least one of the following: a number, a total quantity, and a ratio of the total quantity to a preset value. A category of the target object includes at least one of the following: scheduling signaling, transmission, a feedback, a reference signal, and a sequence.

In some embodiments, the radio frequency unit 1001 is further configured to obtain related information of a target object, where the related information includes at least one of the following: a number, a total quantity, and a ratio of the total quantity to a preset value; and a category of the target object includes at least one of the following: scheduling signaling, transmission, a feedback, a reference signal, and a sequence.

It can be understood that the user equipment 1000 in this embodiment of the present disclosure can implement the processes implemented in the method embodiment shown in FIG. 1 or FIG. 2, and a same beneficial effect is achieved. To avoid repetition, details are not described herein again.

It should be understood that, in this embodiment of the present disclosure, the radio frequency unit 1001 may be configured to receive and send information or a signal in a call process. Specifically, after receiving downlink data from a base station, the radio frequency unit 1001 sends the downlink data to the processor 1010 for processing. In addition, the radio frequency unit 1001 sends uplink data to the base station. Usually, the radio frequency unit 1001 includes but is not limited to an antenna, at least one amplifier, a transceiver, a coupler, a low noise amplifier, a duplexer, and the like. In addition, the radio frequency unit 1001 may communicate with a network and another device through a wireless communication system. The terminal provides wireless broadband Internet access for the user by using the network module 1002, for example, helping the user to send and receive an e-mail, brows a web page, and access streaming media.

The audio output unit 1003 may convert audio data received by the radio frequency unit 1001 or the network module 1002 or stored in the memory 1009 into an audio signal and output the audio signal as a sound. In addition, the audio output unit 1003 may further provide an audio output (for example, a call signal received voice, or a message received voice) related to a specific function implemented by the user equipment 1000. The audio output unit 1003 includes a speaker, a buzzer, a telephone receiver, and the like.

The input unit 1004 is configured to receive an audio signal or a video signal. The input unit 1004 may include a graphics processing unit (Graphics Processing Unit, GPU) 10041 and a microphone 10042, and the graphics processing unit 10041 processes image data of a still picture or video obtained by an image capture apparatus (such as a camera) in a video capture mode or an image capture mode. A processed image frame may be displayed on the display unit 1006. The image frame processed by the graphics processing unit 10041 may be stored in the memory 1009 (or another storage medium) or sent by using the radio frequency unit 1001 or the network module 1002. The microphone 10042 may receive a sound and can process such sound into audio data. Processed audio data may be converted, in a call mode, into a format that can be sent to a mobile communication base station by using the radio frequency unit 1001 for output.

The user equipment 1000 further includes at least one sensor 1005, such as an optical sensor, a motion sensor, and other sensors. Specifically, the light sensor includes an ambient light sensor and a proximity sensor. The ambient light sensor may adjust luminance of the display panel 10061 based on brightness of ambient light. The proximity sensor may turn off the display panel 10061 and/or backlight when the user equipment 1000 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 1005 may further include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information entered by a user or information provided for a user. The display unit 1006 may include a display panel 10061. The display panel 10061 may be configured in a form of a liquid crystal display (Liquid Crystal Display, LCD), an organic light-emitting diode (Organic Light-Emitting Diode, OLED), or the like.

The user input unit 1007 may be configured to receive input numeral or character information, and generate key signal input related to user setting and functional control of the terminal. Specifically, the user input unit 1007 includes a touch panel 10071 and another input device 10072. The touch panel 10071 is also referred to as a touchscreen, and may collect a touch operation performed by a user on or near the touch panel 10071 (such as an operation performed by a user on the touch panel 10071 or near the touch panel 10071 by using any proper object or accessory, such as a finger or a stylus). The touch panel 10071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 1010, and receives and executes a command sent by the processor 1010. In addition, the touch panel 10071 may be of a resistive type, a capacitive type, an infrared type, a surface acoustic wave type, or the like. The user input unit 1007 may include another input device 10072 in addition to the touch panel 10071. Specifically, the another input device 10072 may include but is not limited to a physical keyboard, a functional button (such as a volume control button or a power on/off button), a trackball, a mouse, and a joystick. Details are not described herein.

Further, the touch panel 10071 may cover the display panel 10061. When detecting the touch operation on or near the touch panel 10071, the touch panel 10071 transmits the touch operation to the processor 1010 to determine a type of a touch event, and then the processor 1010 provides corresponding visual output on the display panel 10061 based on the type of the touch event. In FIG. 10, although the touch panel 10071 and the display panel 10061 are used as two independent parts to implement input and output functions of the terminal, in some embodiments, the touch panel 10071 and the display panel 10061 may be integrated to implement the input and output functions of the terminal. This is not limited herein.

The interface unit 1008 is an interface for connecting an external apparatus with the user equipment 1000. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1008 may be configured to receive input (for example, data information and power) from an external apparatus and transmit the received input to one or more elements in the user equipment 1000 or may be configured to transmit data between the user equipment 1000 and an external apparatus.

The memory 1009 may be configured to store a software program and various data. The memory 1009 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1009 may include a high-speed random access memory, and may further include a nonvolatile memory, for example, at least one magnetic disk storage device, a flash storage device, or another volatile solid-state storage device.

The processor 1010 is a control center of the terminal, and connects all parts of the entire terminal by using various interfaces and lines. By running or executing a software program and/or a module stored in the memory 1009 and invoking data stored in the memory 1009, the processor 1010 performs various functions of the terminal and data processing, to perform overall monitoring on the terminal. The processor 1010 may include one or more processing units. In some embodiments, an application processor and a modem processor may be integrated into the processor 1010. The application processor mainly processes an operating system, a user interface, an application program, and the like. The modem processor mainly processes wireless communications. It can be understood that, alternatively, the modem processor may not be integrated into the processor 1010.

The user equipment 1000 may further include the power supply 1011 (such as a battery) that supplies power to each component. In some embodiments, the power supply 1011 may be logically connected to the processor 1010 by using a power supply management system, so as to implement functions such as charging and discharging management, and power consumption management by using the power supply management system.

In addition, the user equipment 1000 may further include some function modules not shown, and details are not described herein.

Figure 11:
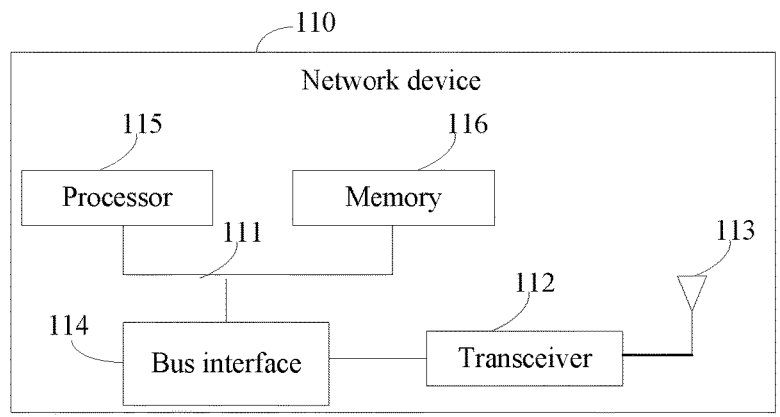
FIG. 11 is a schematic structural diagram of a network device according to an embodiment of the present disclosure.

Referring to FIG. 11, FIG. 11 is a schematic diagram of a hardware structure of a network device for implementing the embodiments of the present disclosure. The network device 110 includes but is not limited to a bus 111, a transceiver 112, an antenna 113, a bus interface 114, a processor 115, and a memory 116.

In this embodiment of the present disclosure, the network device 110 further includes a computer program that is stored in the memory 116 and that can be run on the processor 115.

Specifically, the network device 110 is a control device, and the following step is implemented when the computer program is executed by the processor 115:

sending first information where the first information is related information of a target object, and the related information includes at least one of the following: a number, a total quantity, and a ratio of the total quantity to a preset value; and a category of the target object includes at least one of the following:

scheduling signaling, transmission, a feedback, a reference signal, and a sequence.

The network device 110 in this embodiment of the present disclosure can implement the processes in the method embodiment shown in FIG. 1, and a same beneficial effect is achieved. To avoid repetition, details are not described herein again.

The transceiver 112 is configured to receive and send data under control of the processor 115.

In FIG. 11, for a bus architecture (represented by a bus 111), the bus 111 may include any quantity of interconnecting buses and bridges, and the bus 111 interconnects various circuits of one or more processors represented by the processor 115 and a memory represented by a memory 116. The bus 111 may further link together various other circuits, such as a peripheral device, a voltage regulator, and a power management circuit. These are all well known in the art. Therefore, this specification provides no further description. The bus interface 114 provides an interface between the bus 111 and the transceiver 112. The transceiver 112 may be one component or may be a plurality of components, for example, a plurality of receivers and transmitters, and provide a unit that is configured to communicate with various other apparatuses on a transmission medium. Data processed by the processor 115 is transmitted on a wireless medium by using the antenna 113. Further, the antenna 113 further receives data and transmits the data to the processor 115.

The processor 115 is responsible for managing the bus 111 and general processing, and may further provide various functions, including timing, peripheral interfacing, voltage regulation, power management, and another control function. The memory 116 may be configured to store data used by the processor 115 executing an operation.

In some embodiments, the processor 115 may be a Central Processing Unit (CPU), an Application Specific Integrated Circuits (ASIC), a Field-Programmable Gate Array (FPGA), or a Complex Programmable Logic Device (CPLD).

An embodiment of this application further provides a computer-readable storage medium. The computer-readable storage medium stores a computer program, and when the computer program is executed by a processor, the processes of the foregoing transmission control method embodiment shown in FIG. 1 or FIG. 2 are implemented and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A transmission control method, executed by a control device, comprising:

sending first information by using first signaling, wherein:

when the first signaling is scheduling signaling for scheduling a Physical Uplink Shared CHannel (PUSCH) or Physical Downlink Shared CHannel (PDSCH), the first information is related information associated with Uu transmission, or when the first signaling is scheduling signaling for scheduling a Physical Sidelink Shared CHannel (PSSCH), the first information is the related information associated with the sidelink transmission, wherein:

the related information comprises a counter Downlink Assignment Index (cDAI) or a total Downlink Assignment Index (tDAI), and a monitoring occasion in a search space of the scheduling signaling for scheduling sidelink does not overlap a monitoring occasion in a search space of the scheduling signaling for scheduling Uu transmission.

2. The transmission control method according to claim 1, wherein different scheduling signaling is associated with different types, and the types comprise at least one of the following:
- a type of transmission corresponding to the scheduling signaling,
- a type of a search space of the scheduling signaling,
- a type of a monitoring occasion of the scheduling signaling,
- a carrier type,
- a resource pool type,
- a user type,
- a group type,
- a service type,
- a transmission manner type, or
- a resource type.

3. The transmission control method according to claim 2, wherein the type of the monitoring occasion of the scheduling signaling comprises at least one of the following:
- a monitoring occasion that is used to schedule sidelink transmission, or
- a monitoring occasion that is used to schedule Uu transmission.

4. A transmission control method, executed by a user equipment, comprising:
obtaining first information by using first signaling, wherein:
when the first signaling is scheduling signaling for scheduling a Physical Uplink Shared CHannel (PUSCH) ) or Physical Downlink Shared CHannel (PDSCH), the first information is related information associated with the Uu transmission, or
when the first signaling is scheduling signaling for scheduling a Physical Sidelink Shared CHannel (PSSCH), the first information is the related information associated with the sidelink transmission,
wherein:
the related information comprises a counter Downlink Assignment Index (cDAI) or a total Downlink Assignment Index (tDAI), and
a monitoring occasion in a search space of the scheduling signaling for scheduling sidelink does not overlap a monitoring occasion in a search space of the scheduling signaling for scheduling Uu transmission.

5. The transmission control method according to claim 4, wherein after the obtaining the first information, the transmission control method further comprises at least one of the following:
determining related information of a first target object; and
determining related information of a second target object, wherein
the first target object is associated with a first target type; and the second target object is associated with a second target type.

6. The transmission control method according to claim 4, wherein
the different scheduling signaling is associated with different types, and the types comprise at least one of the following:
- a type of transmission corresponding to the scheduling signaling,
- a type of a search space of the scheduling signaling,
- a type of a monitoring occasion of the scheduling signaling,
- a carrier type,
- a resource pool type,
- a user type,
- a group type,
- a service type,
- a transmission manner type, or
- a resource type.

7. The transmission control method according to claim 6, wherein the type of the monitoring occasion of the scheduling signaling comprises at least one of the following:
- a monitoring occasion that is used to schedule sidelink transmission, or
- a monitoring occasion that is used to schedule Uu transmission.

8. The transmission control method according to claim 4, further comprising:
determining feedback information based on the related information of the scheduling signaling.

9. The transmission control method according to claim 8, wherein the determining feedback information comprises:
determining at least one of the following of the feedback information:
a size, a type, and content.

10. The transmission control method according to claim 9, wherein:
sizes of the feedback information corresponding to different target objects in the feedback information are related to corresponding transmission manners; or
types of feedback information corresponding to different target objects in the feedback information correspond to corresponding target objects; or
feedback information corresponding to different target objects in the feedback information is arranged in order of corresponding target objects.

11. A communications device, comprising a memory, a processor, and a computer program that is stored in the memory that can be run on the processor, wherein the computer program, when executed by the processor, causes the processor to implement a transmission control method, the transmission control method comprising:
obtaining first information,
wherein:
when the first signaling is scheduling signaling for scheduling a Physical Uplink Shared CHannel (PUSCH) ) or Physical Downlink Shared CHannel (PDSCH), the first information is related information associated with the Uu transmission, or
when the first signaling is scheduling signaling for scheduling a Physical Sidelink Shared CHannel (PSSCH), the first information is the related information associated with the sidelink transmission,
wherein:
the related information comprises a counter Downlink Assignment Index (cDAI) or a total Downlink Assignment Index (tDAI), and
a monitoring occasion in a search space of the scheduling signaling for scheduling sidelink does not overlap a monitoring occasion in a search space of the scheduling signaling for scheduling Uu transmission.

12. The communications device according to claim 11, wherein after the obtaining the first information, the transmission control method further comprises at least one of the following:
   determining related information of a first target object; and
   determining related information of a second target object, wherein
   the first target object is associated with a first target type; and
   the second target object is associated with a second target type.

13. The communications device according to claim 11, wherein different scheduling signaling is associated with different types, and the types comprise at least one of the following:
   a type of transmission corresponding to the scheduling signaling,
   a type of a search space of the scheduling signaling,
   a type of a monitoring occasion of the scheduling signaling,
   a carrier type,
   a resource pool type,
   a user type,
   a group type,
   a service type,
   a transmission manner type, or
   a resource type.

14. The communications device according to claim 13, wherein the type of the monitoring occasion of the scheduling signaling comprises at least one of the following:
   a monitoring occasion that is used to schedule sidelink transmission, or
   a monitoring occasion that is used to schedule Uu transmission.

* * * * *